United States Patent [19]

Cooper et al.

[11] 4,074,814

[45] Feb. 21, 1978

[54] METHOD AND APPARATUS FOR CONTROLLING SURFACE TRAVERSING DEVICE

[75] Inventors: David Eugene Cooper, Rossville, Ga.; Leon Clyde Hendee, III, Chattanooga, Tenn.; Walter Guy Hill, Jr., Rossville, Ga.; Adam Leshem, West Hartford; Martin Lewis Marugg, Enfield, both of Conn.

[73] Assignee: Combustion Engineering, Inc., Windsor, Conn.

[21] Appl. No.: 670,806

[22] Filed: Mar. 26, 1976

[51] Int. Cl.² .............................................. B25J 9/00
[52] U.S. Cl. ................................... 214/1 BB; 165/76; 214/152; 254/105
[58] Field of Search .................. 214/1 CM, 1 R, 152, 214/1 BB; 165/76; 254/105, 108, 109, 110, 111, 112

[56] References Cited

U.S. PATENT DOCUMENTS 3,889,820  6/1975  Ranger .......................... 214/1 CM X
3,913,752  10/1975  Ward et al. .................. 214/1 CM X

*Primary Examiner*—Frank E. Werner

[57] ABSTRACT

A method and apparatus are provided for controlling the movement of a surface traversing apparatus across a member which has an ordered array of openings in it's surface. Move control routines are provided, each of which instruct the traversing apparatus to move incrementally over the surface of the member by disengaging, incrementally moving, and re-engaging one of two stepping arms. Each routine operates to advance the apparatus an increment in one of a number of directions. Some of the routines move the apparatus parallel to lines or rows of openings. Others move the apparatus diagonally. Each routine senses the relative positioning of the two stepping arms to establish the sequence of operations and returns the stepping arm to its former position if it is unable to complete a step. An automatic selection operation may move the apparatus toward a target opening by comparing the present location of the apparatus with the target address and selecting a routine which minimizes the number of move increments needed to get to the target.

25 Claims, 33 Drawing Figures

FIG.1
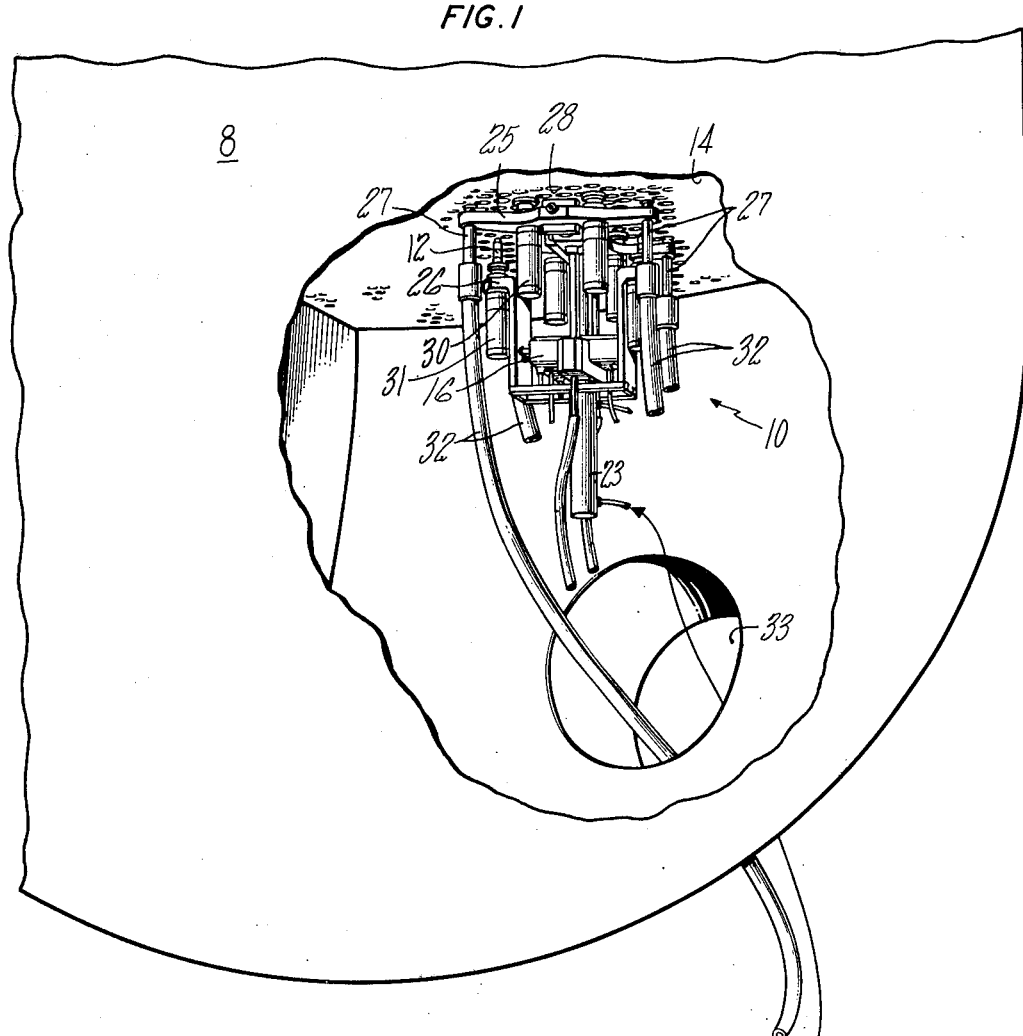
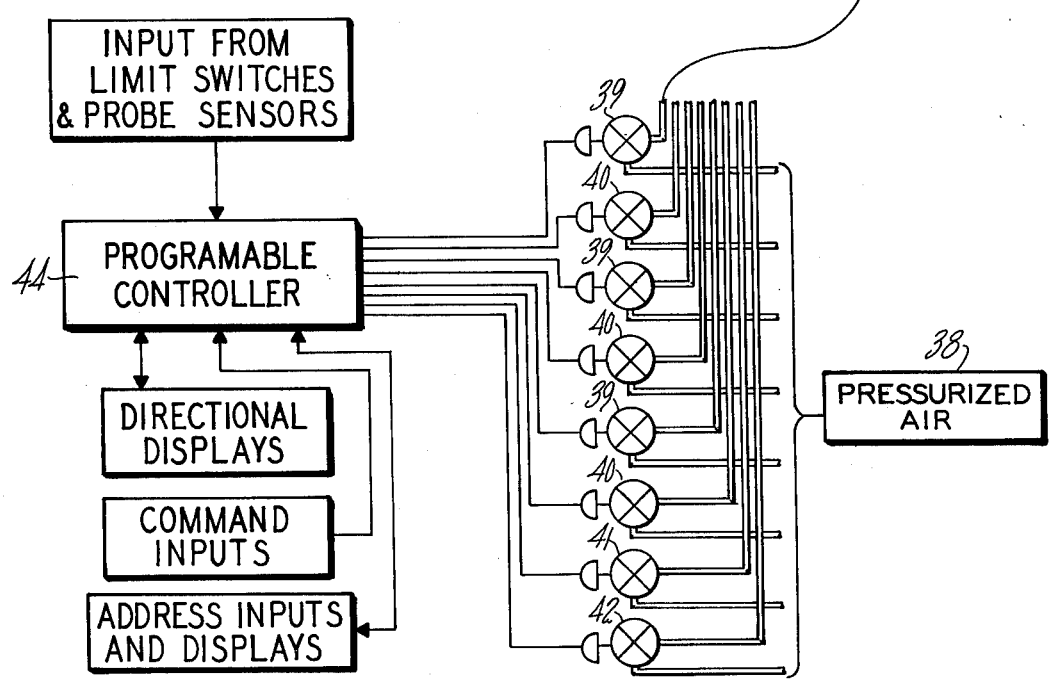

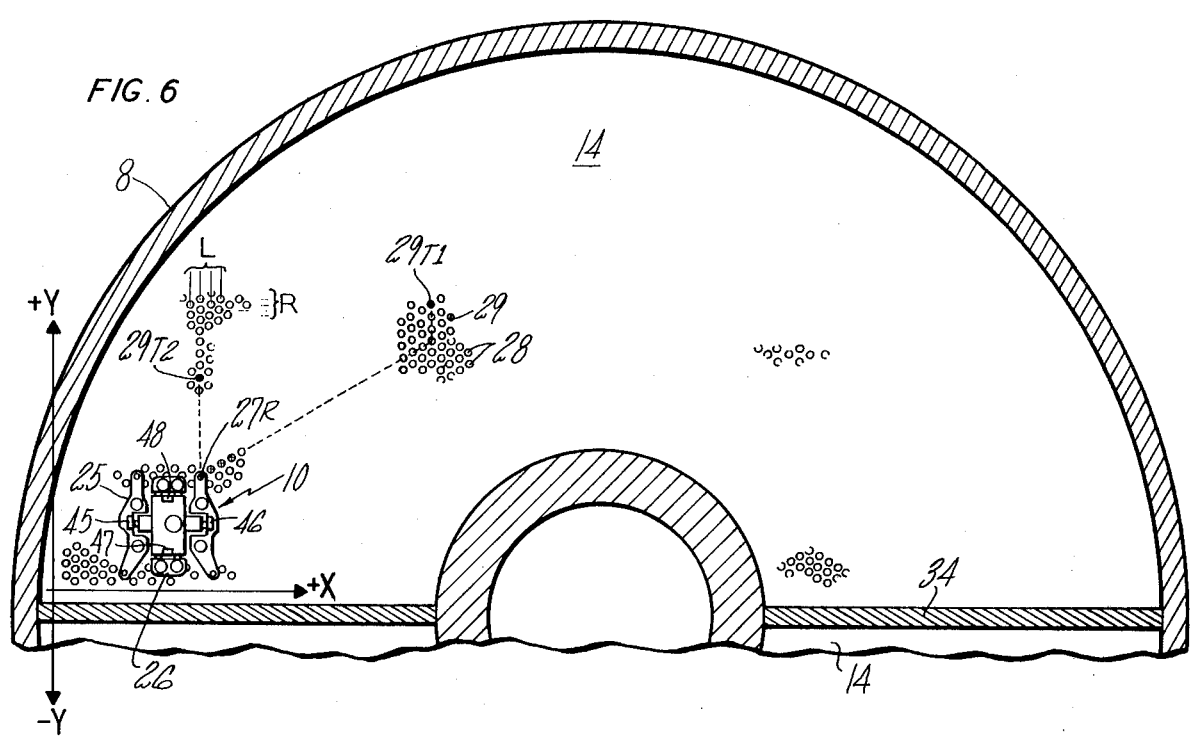
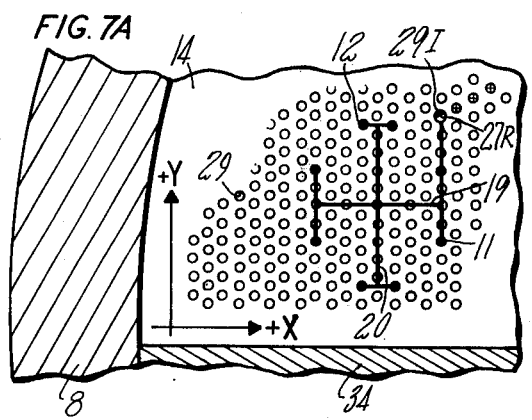
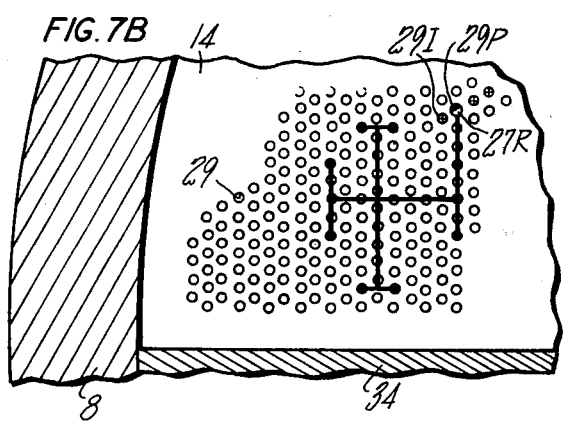
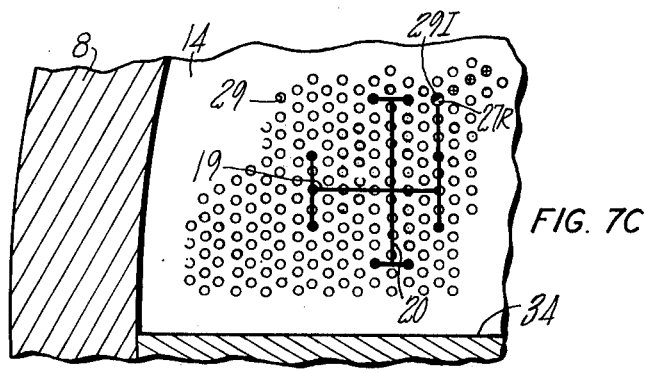

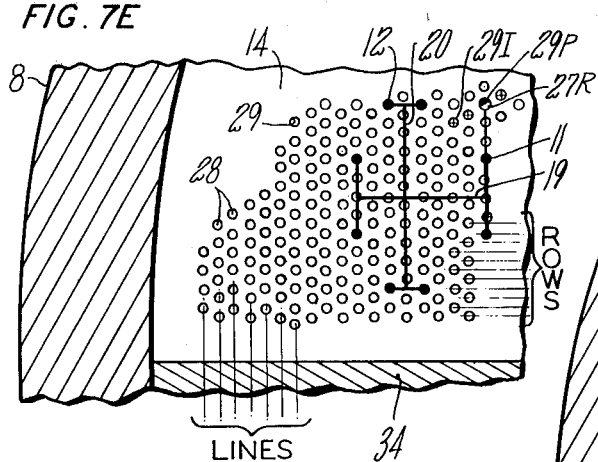
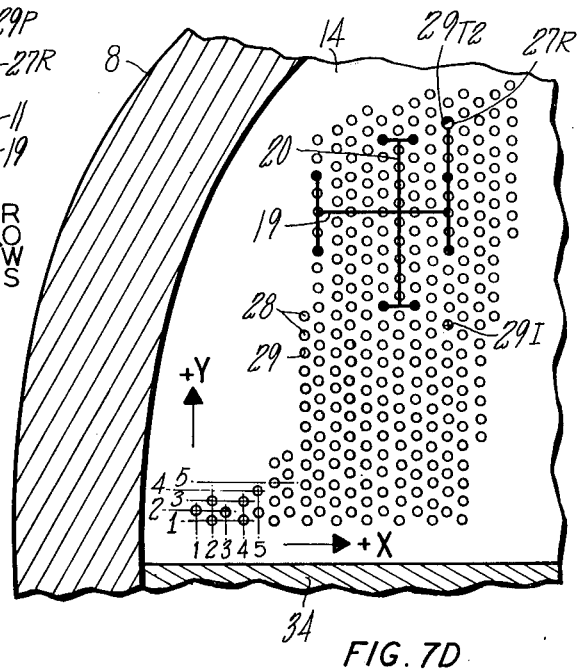

FIG. 8A *MAIN PROGRAM*
FIG. 8B *MOVE ROUTINE*
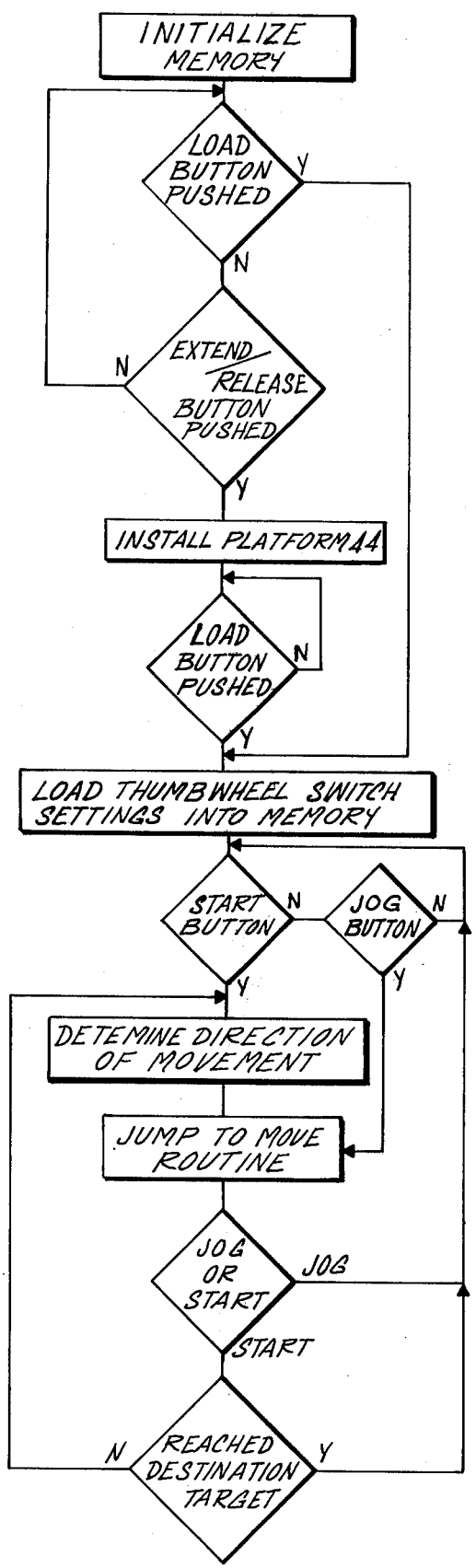
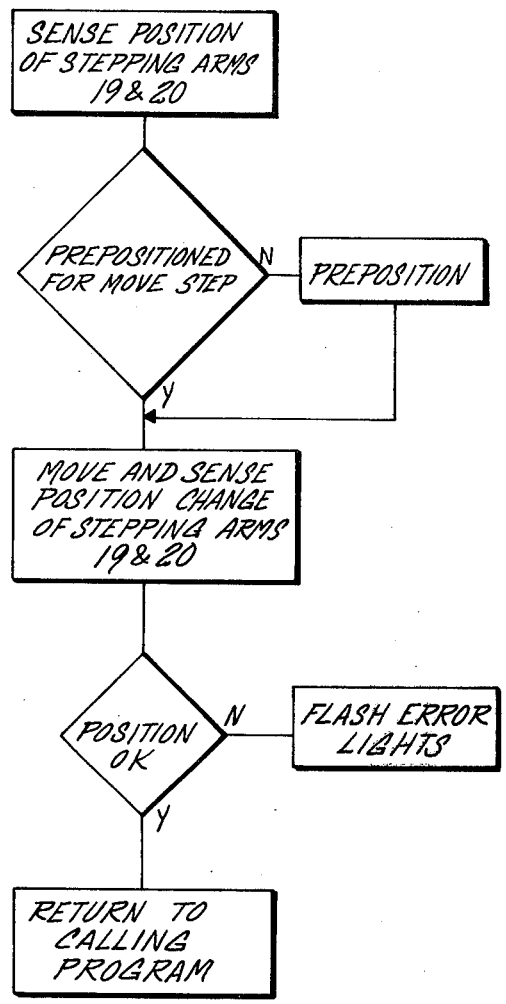

FIG. 9A *POWER UP*
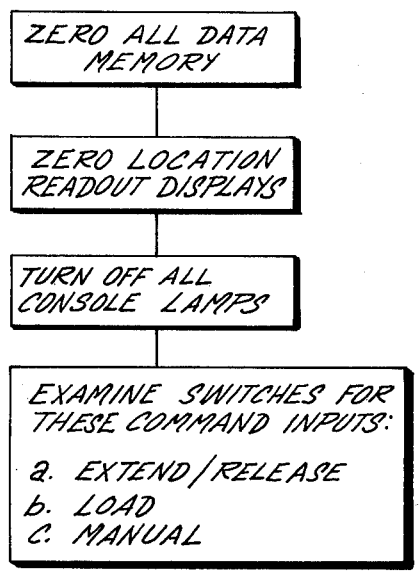
FIG. 9B *EXTEND/RELEASE*
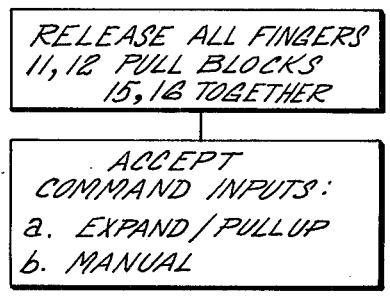
FIG. 9C *EXPAND/PULLUP*
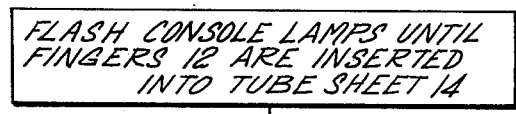
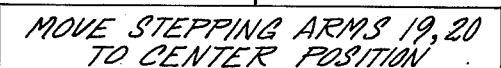
FIG. 9D *LOAD*
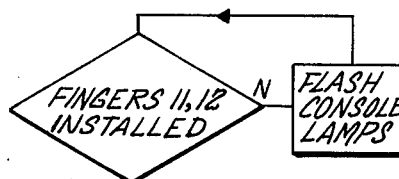
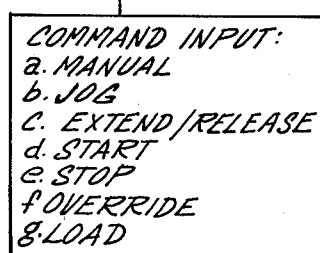
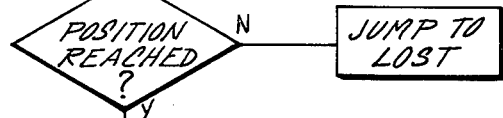

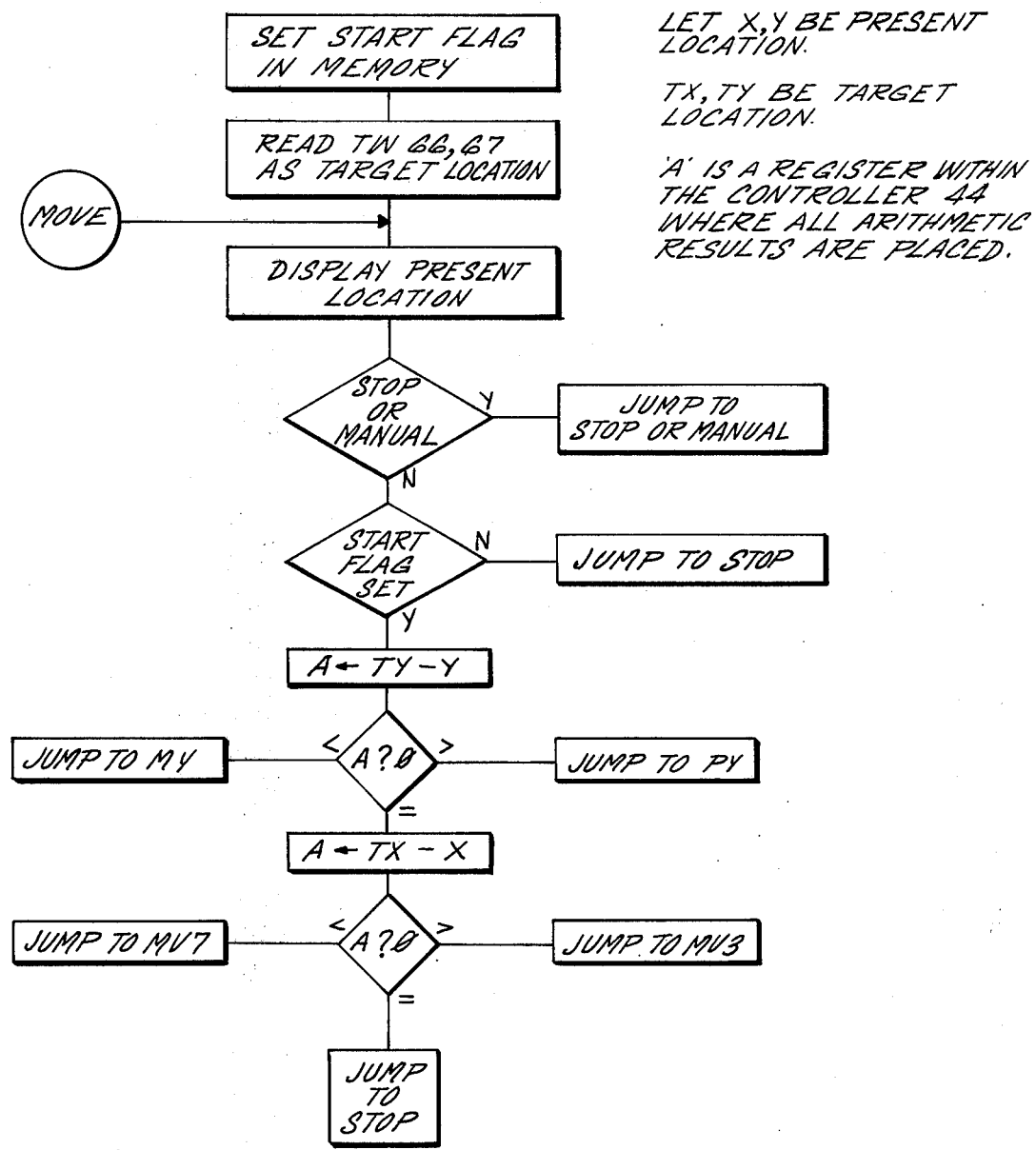

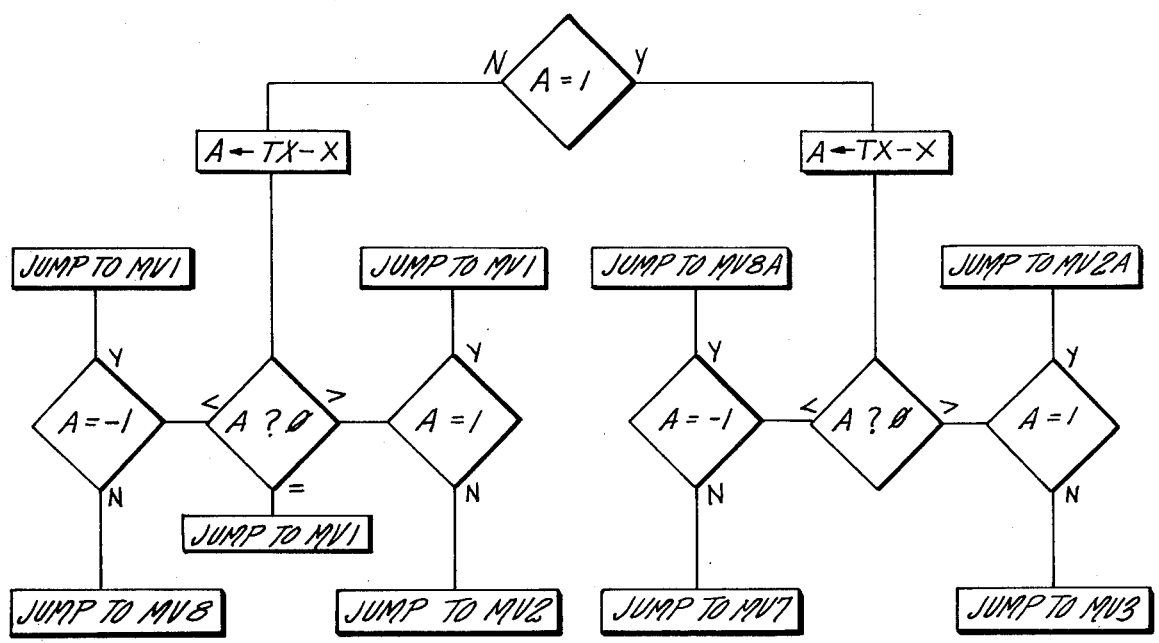
FIG. 9F  PY
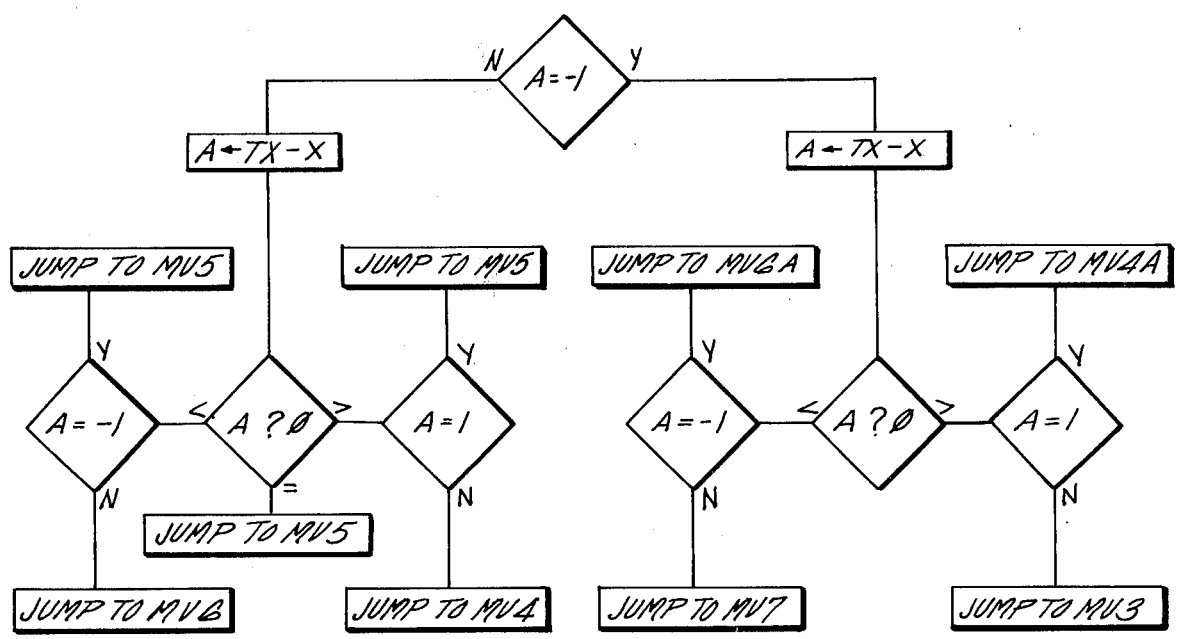
FIG. 9G  MY

FIG. 9H MOVE ROUTINES
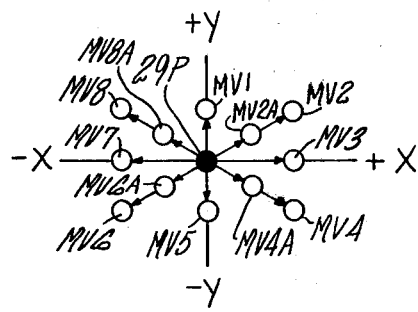
FIG. 9I STOP
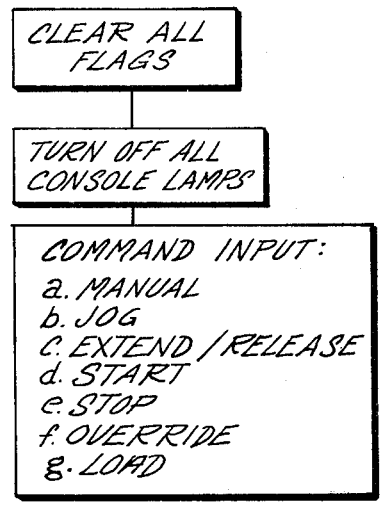
FIG. 9J MV1
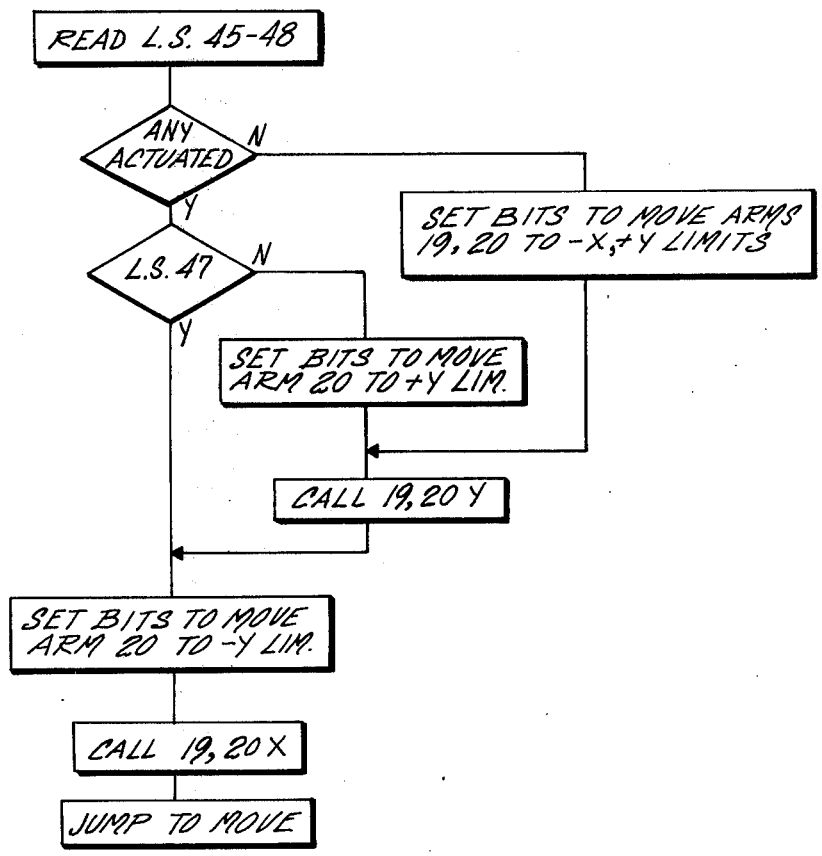
IF NONE OF L.S. 45-48 ARE PRESSED, ASSUME STEPPING ARMS 19, 20 ARE CENTERED AND A DIAGONAL 'COCKING' STEP IS MADE.
IF L.S. 47 IS NOT PRESSED, A STRAIGHT 'COCKING' STEP IS MADE.

FIG. 9K  MV2
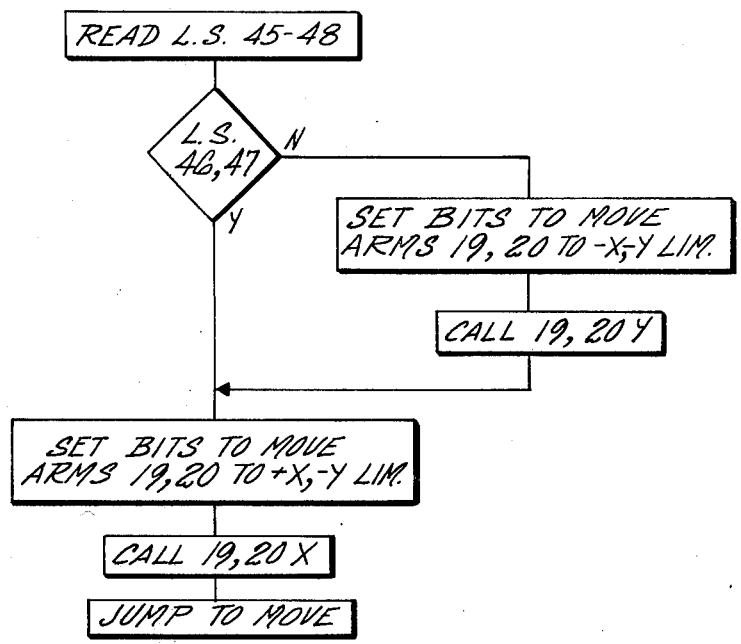
FIG. 9L  MV2A
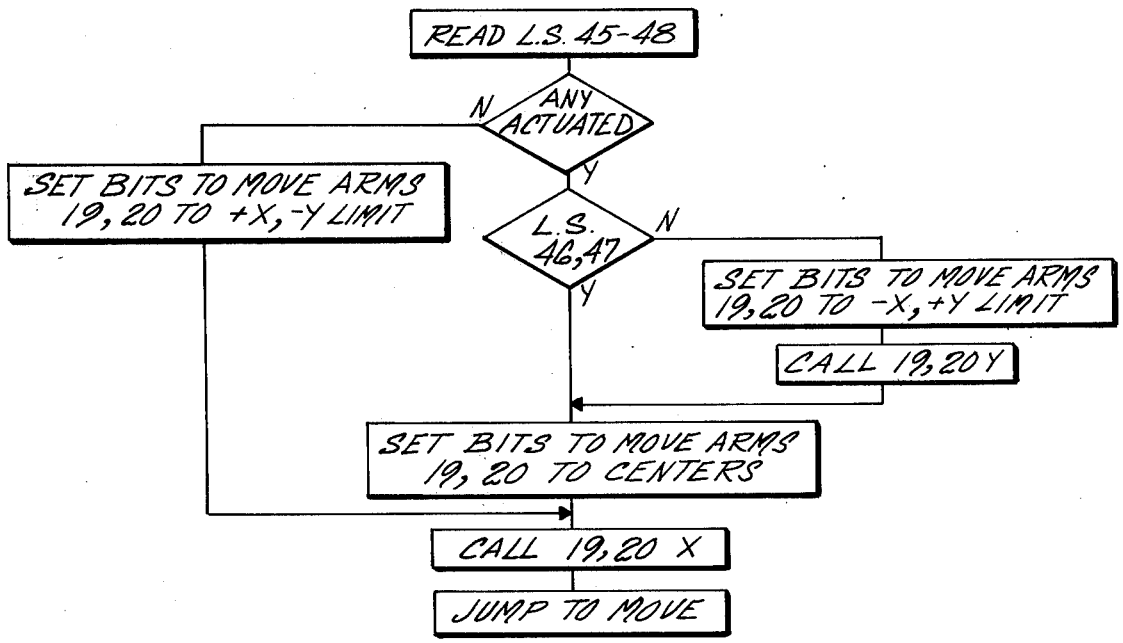
IF NONE OF L.S. 45-48 ARE PRESSED, ASSUME STEPPING ARMS 19, 20 ARE CENTERED AND A SINGLE HOLE DIAGONAL MOVE CAN BE MADE.
IF L.S. 46 & 47 ARE NOT PRESSED, A "COCKING" STEP IS REQUIRED BEFORE THE PROBE-MOVING STEP.

FIG. 9N  19, 20 Y
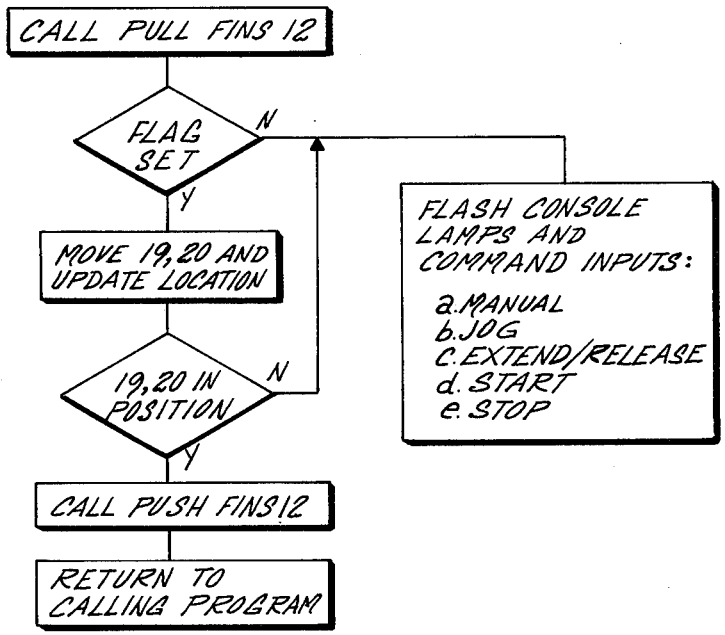
FIG. 9P  PULL FINS 11
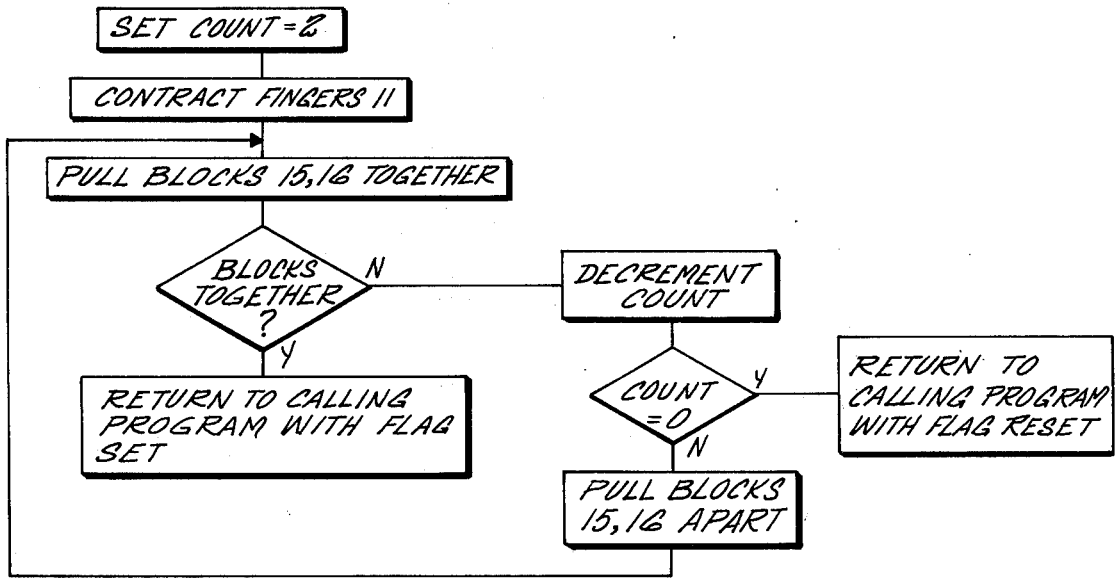
FOR PULL FINGERS 12
a. CONTRACT FINGERS 12.
b. EXCHANGE BLOCKS TOGETHER AND APART OPERATIONS.

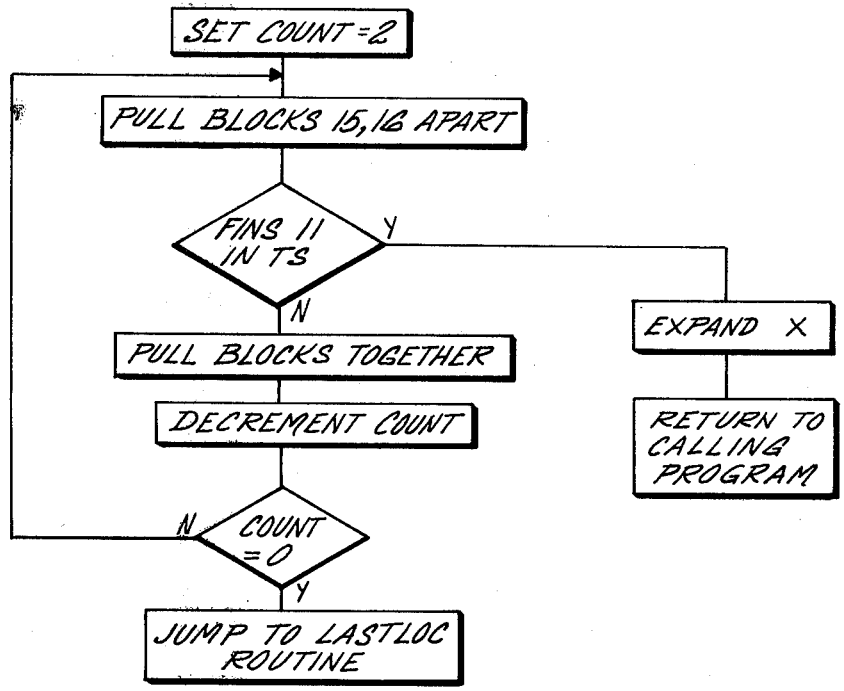
FIG. 9Q PUSH FINS 11 (INTO TS)
FOR PUSH FINGERS 12
 a. REPLACE 11 WITH 12.
 b. EXCHANGE BLOCKS APART AND TOGETHER OPERATIONS.
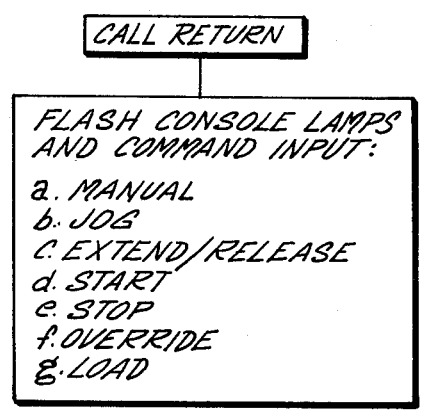
FIG. 9R LASTLOC FIGS. 9S, 9T          RETURN                              LOST
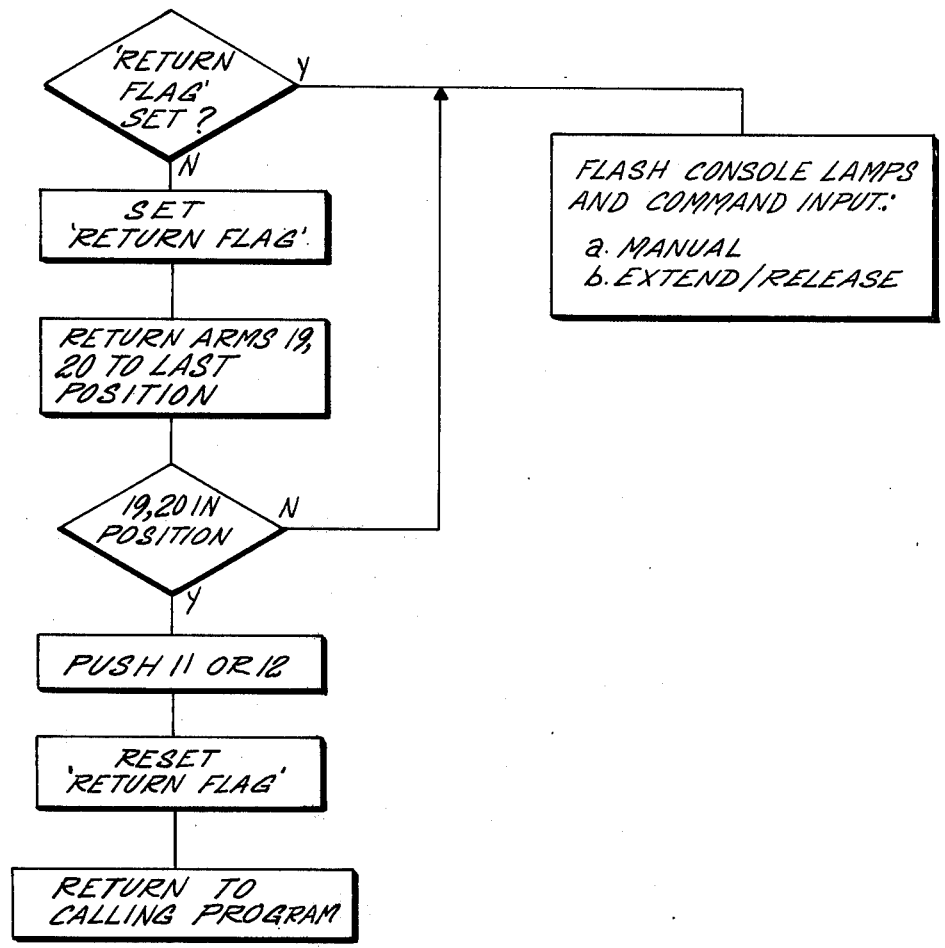

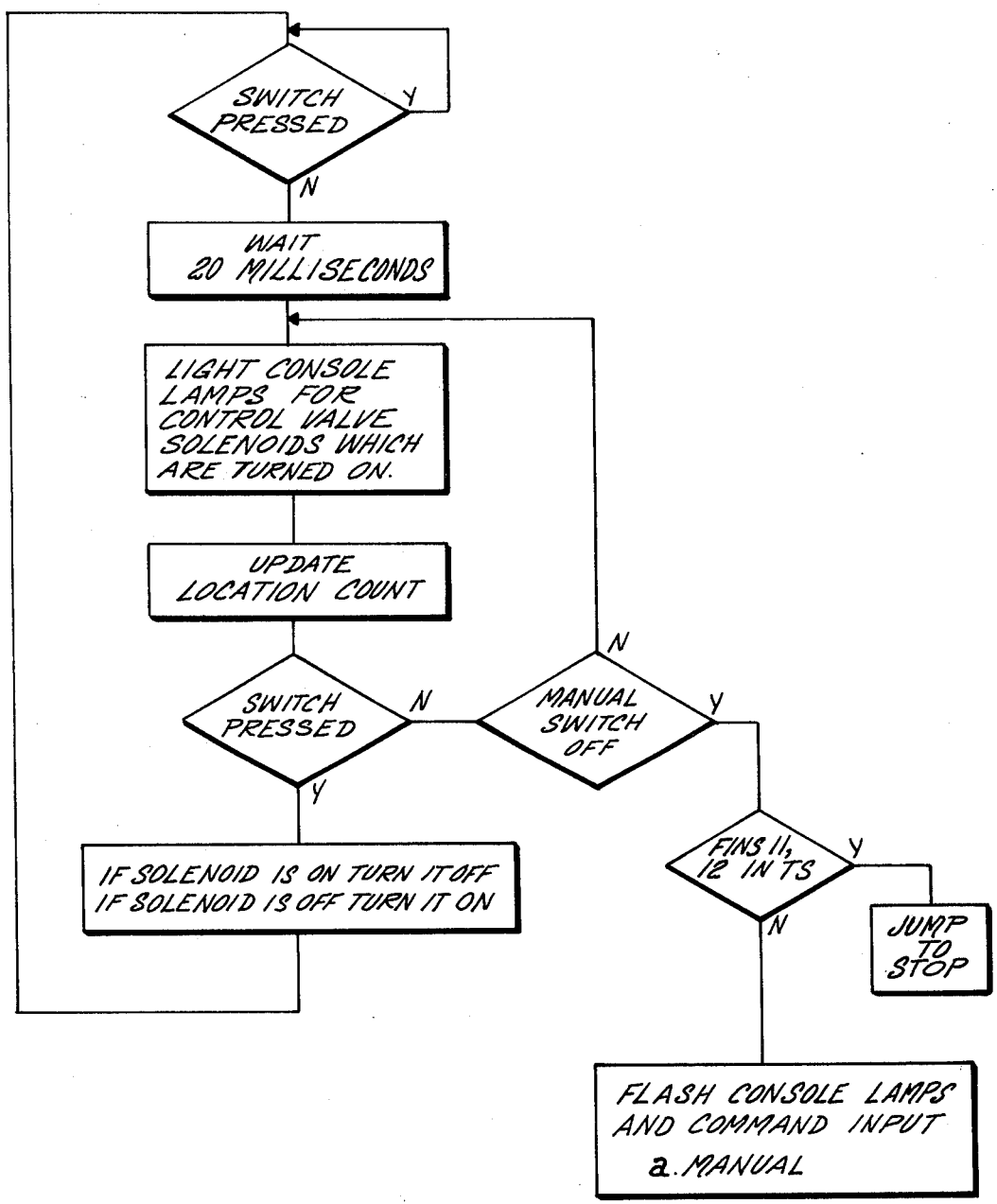
FIG. 90 MANUAL

METHOD AND APPARATUS FOR CONTROLLING SURFACE TRAVERSING DEVICE

SUMMARY OF THE INVENTION

The invention relates generally to surface traversing apparatus and more particularly to the method and apparatus for controlling the movement of surface traversing apparatus across the surface of a member.

One type of surface traversing apparatus is described in U.S. Pat. No. 3,811,320 of Cowell issued May 21, 1974 for "Surface Scaling Apparatus" wherein a pair of arms are movable one across the other by a pair of stepping motors providing numerous incremental positionings and selectively actuable magnets serve to anchor the respective arms to a surface. Design of such apparatus is simplified because of its intended use on a continuous surface.

In certain applications, however, such as the inspection and/or repair of tubes in a nuclear steam generator or the like, it is desirable to have a surface traversing apparatus which is capable of moving across a surface which contains an array of openings therein by alternately selectively inserting and removing each of two sets of anchor fingers on two stepping arms respectively into and from different openings in the array and reciprocably moving the stepping arms transversely of, or across, one another while one set of fingers is removed from the openings, as disclosed in U.S. Pat. No. 3,913,752 of Ward et al issued Oct. 21, 1975 for "Remotely Movable Platform." Further, the openings in the array may be arranged in a non-rectangular patterning, such as a triangular pattern. While the aforementioned U.S. Pat. No. 3,913,752 did consider movement of such a cross-armed stepping apparatus on a triangularly patterned array of openings, its movement was discussed in only four mutually perpendicular directions.

It is an object of the invention to provide a method and apparatus which cause a crossed-arm surface traversing apparatus to move across a surface which contains an ordered array of openings from one opening to any other opening in a manner which minimizes the length of the path traveled between the one opening and the other. Included in this object is the provision of a method and apparatus for controlling stepping of the crossed-arms of the surface traversing apparatus such that it is movable in any of eight directions, a first four of the directions being mutually perpendicular to one another and each of the remaining four directions being angularly intermediate a respective different pair of the first four directions. Further included in this object is the provision of a surface traversing apparatus and control arrangement therefor which is particularly suited to traversing a surface containing a triangularly repetitive pattern of openings.

It is another object of the invention to provide a method and apparatus for automatically moving a surface traversing apparatus of the type described from one opening to any other opening in an array of openings in the surface of a member. Included in this object is the provision of a method and apparatus for effecting semi-automatic control of the movements of the surface traversing apparatus. Further included in this object is the provision of a method and apparatus for minimizing any adverse consequences otherwise resulting when an anchor finger of the surface traversing apparatus is blocked from entering an opening.

It is a still further object of the invention to provide in a surface traversing apparatus having a pair of stepping arms each of which extends transversely of the other and is reciprocable to at least two or no more than three respective discrete longitudinal positions, a method and apparatus for automatically moving the surface traversing apparatus in any particular one of a multiplicity of directions from any of the possible relative positioning of the two stepping arms.

According to the present invention, a surface traversing apparatus which has a pair of mutually transversely extending, or crossed, reciprocable stepping arms which each mount anchor fingers is structured and controlled, automatically, semi-automatically or manually, in a manner which results in accurate movement across the surface of a member which contains an array of openings in its surface into and from which the anchor fingers are selectively inserted and removed. Because the member openings are patterned in plural parallel lines and plural parallel rows which extend transversely of one another, a Cartesian coordinate system is employed to identify the location of each member openings, and the two stepping arms are respectively reciprocable parallel to the respective lines and rows of member openings. Separate drive mechanisms are operative to longitudinally step each of the stepping arms to each of two opposite extreme positions and, in a preferred embodiment, to an intermediate position. Further drive mechanisms are operative to selectively move the anchor fingers associated with each stepping arm selectively into and out of openings for respectively engaging and disengaging the respective arm with the member.

A plurality of predetermined move sequences are provided, as in a program stored in a programmable controller, and the apparatus is moved from one location to another by selectively applying one or more of the move sequences to the various drive mechanisms. One or more of the move sequences is operative to move the apparatus parallel to a row or a line of member openings respectively, and one or more others of the move sequences is operative to move the apparatus at an angle to the rows and lines of member openings. By appropriately combining moves parallel to a line or row of member openings with moves at an angle therebetween, the apparatus is moved over a relatively direct path to a target opening. In the preferred embodiment of the invention, the appropriate combination of moves is automatically determined by a controller which compares the coordinates of a present location of the apparatus with the coordinates of a target location to ascertain the algebraic difference therebetween and logically selects the move sequences as a function of any such difference.

Each move sequence includes a final step of the apparatus in the direction intended and provides for prepositioning the stepping arms to make the final step should that be necessary as determined by position sensing means on the stepping arms and, in the preferred embodiment, by position verifying logic in the controller.

The invention additionally includes a method and apparatus for sensing when an anchor finger either cannot be inserted into or withdrawn from a supposed opening, due to blockage, interference or the like, and for automatically returning the respective stepping arms to its last position when entry is prevented. Two attempts are made at insertion or removal. In a semi-automatic mode, an arm of the apparatus may be intentionally extended to a new position and returned to the old position without engaging its anchor fingers at the new position.

Where the patterning of the member openings is triangular, the surface traversing apparatus is structured such that each stepping arm includes an intermediate position in its stroke, the stroke length to either side of the intermediate position is one half the distance between adjacent openings in the respective row or line and the move sequences may utilize the intermediate positioning of either or both of the stepping arms for effecting abbreviated moves diagonally of the rows and lines of openings such that the apparatus is capable of moving to every opening in the array.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 1 is a perspective view of a surface traversing apparatus operatively positioned beneath the tube sheet in a nuclear steam generator, including a generalized diagrammatic representation of the control apparatus associated therewith;

FIG. 6 is a partial transverse section of a steam generator taken below the tube sheet and looking upwardly at the surface traversing apparatus positioned thereon;

FIGS. 7A-E are enlarged partial views of the tube sheet of FIG. 6 diagrammatically showing the surface traversing apparatus (s.t.a.) at different locations thereon, and wherein:

FIG. 7A shows the s.t.a. at the location of initial installation;

FIG. 7B shows the s.t.a. as having moved diagonally one opening in the +x, +y direction from FIG. 7A;

FIG. 7C shows the s.t.a. as having moved only the non-reference arm diagonally one opening in the +x, +y directions from FIG. 7A preparatory to moving to a target in the same line of openings as occupied by the reference arm in FIG. 7A;

FIG. 7D shows the s.t.a. as having moved parallel to the "y" axis from its FIG. 7A location to the target in the same line of openings; and FIG. 7E shows the s.t.a. as having completed a full two-opening diagonal move in the +x, +y direction from FIG. 7A toward a target opening in the +x, +y general direction therefrom;

FIGS. 8A and 8B depict generalized flow charts of the control sequences comprising the method of the invention.

DESCRIPTION OF THE PREFERRED EMBODIMENT

Figure 2:
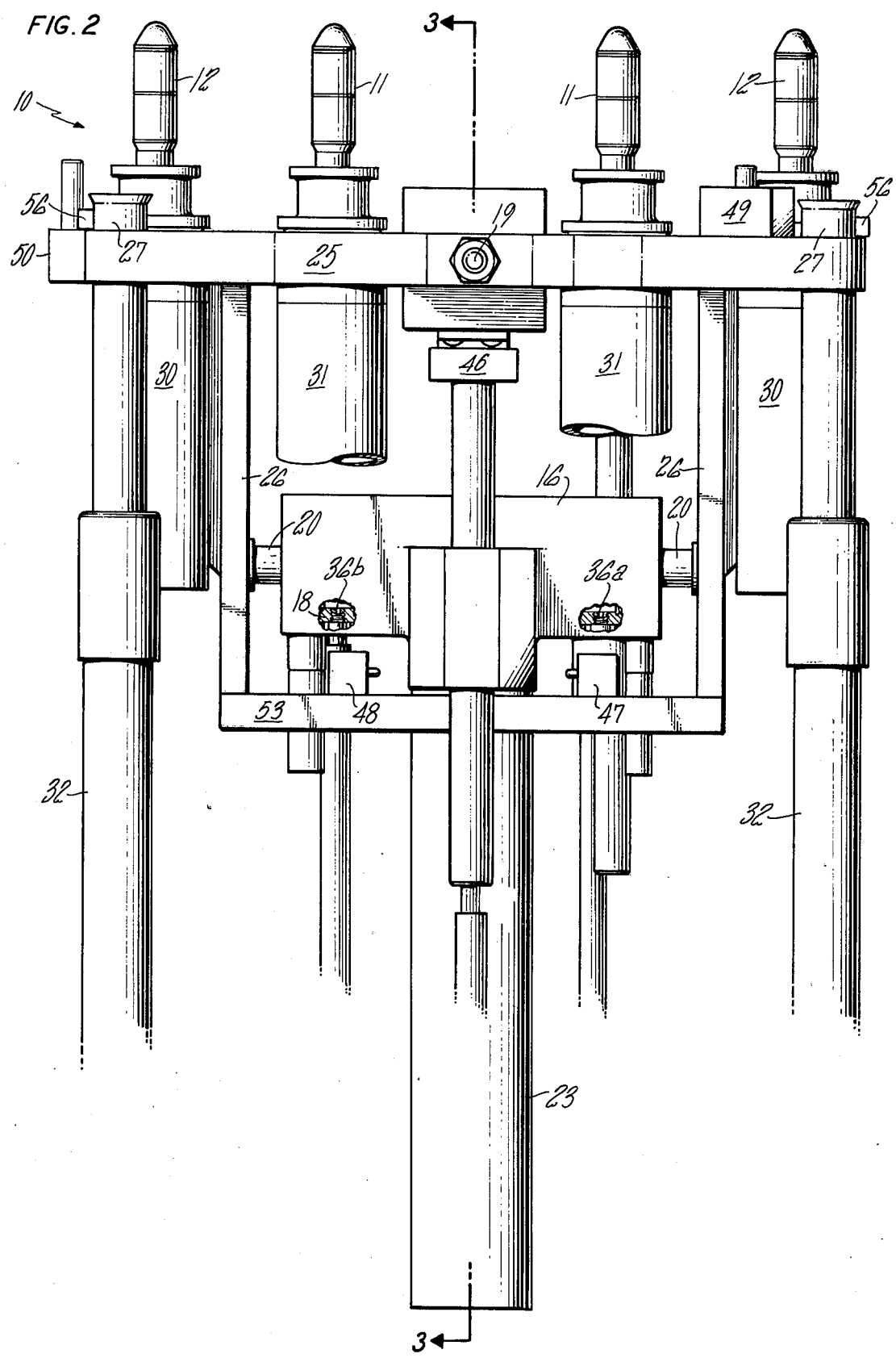
FIG. 2 is an enlarged side elevation of the surface traversing apparatus of FIG. 1.

Referring now to the drawings wherein like numerals in the several Figures represent like parts, there is depicted in FIG. 1 a surface traversing apparatus or walking platform 10 of the type described and claimed in U.S. Pat. applications Ser. Nos. 633,063, 633,064, and 633,065 respectively of Adam Leshem; Adam Leshem and Frank J. Formanek; and Adam Leshem, Martin L. Marugg and Dennis E. Savor respectively for "Three-Position Actuator and Apparatus Incorporating Same," "Improved Surface Traversing Apparatus" and "Improved Mounting Arrangement For Anchor Fingers On A Surface Traversing Apparatus" respectively and each filed on Nov. 18, 1975. Reference may be made to the immediately aforementioned applications as required to supplement the following description of the platform 10.

The platform 10 as illustrated in FIG. 1 is in operative orientation beneath the undersurface of a tube sheet 14 in a nuclear steam generator 8 and is comprised of a pair of vertically separable base blocks 15 and 16 which respectively house linear actuators, such as self-centering cylinders 17 and 18, for driving stepping arms 19 and 20 respectively. The cylinders 17 and 18 are oriented orthogonally of one another, each with a respective pair of pistons rods extending from the opposite ends of their respective pistons 21 and 22, the piston rod pairs forming the stepping arms 19 and 20 respectively. A linear actuator, such as the vertically oriented double acting cylinder 23 fixed to the lower base block 16 and having its piston rod 24 fixed to the upper base block 15, serves to interconnect the base blocks 15 and 16 in variably spaceable relationship. Each pair of stepping arms 19 and 20 will be referred to hereinafter in either the singular or the plural as is convenient.

Figure 3:
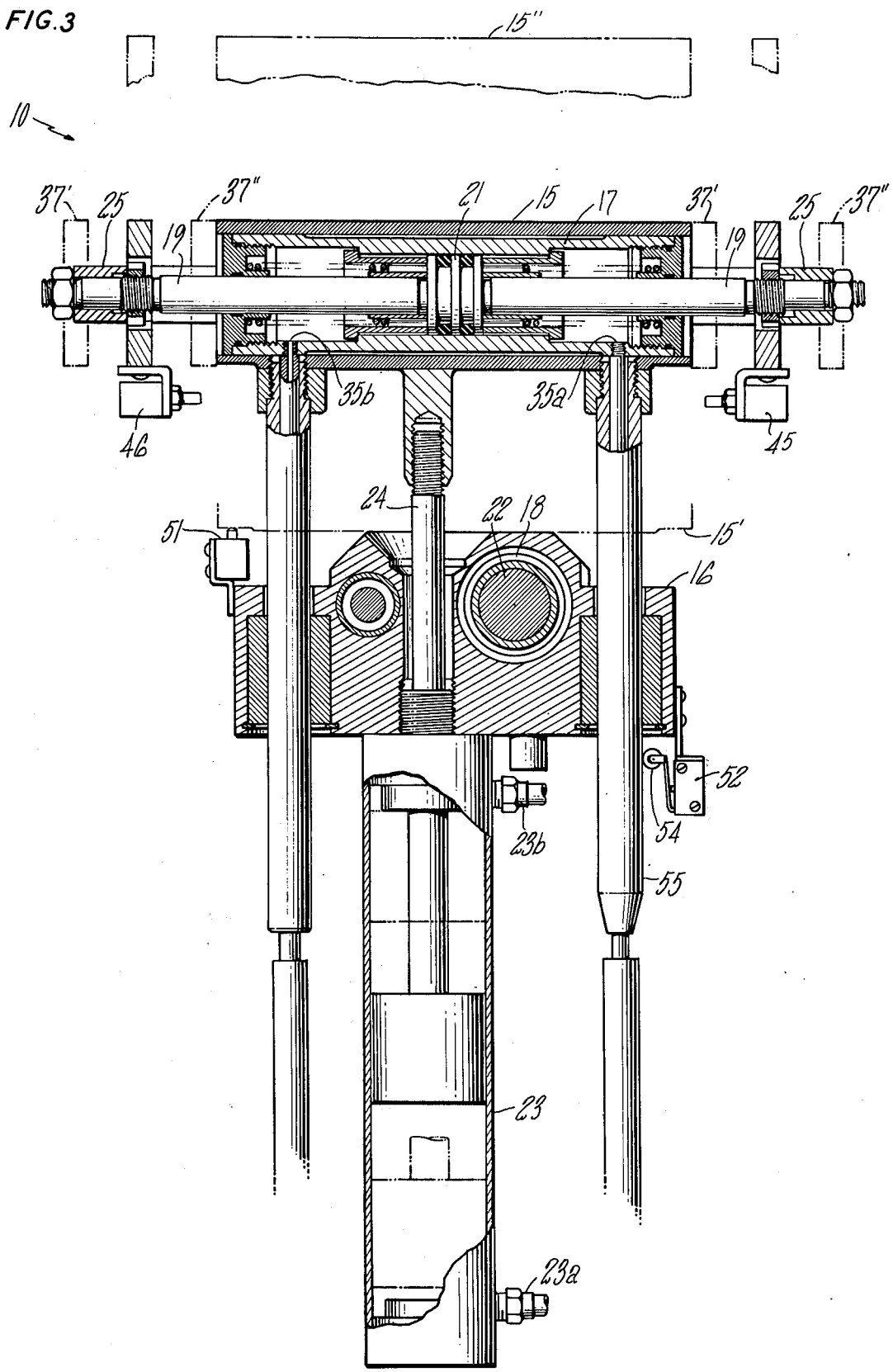
FIG. 3 is an enlarged section of the surface traversing apparatus, with portions broken away, taken substantially along lines 3—3 of FIG. 2 and representatively illustrating the actuators employed therein.

A pair of mounting plates 25 are fixed to the respective outer ends of the pair of stepping arms 19, and anothr pair of mounting plates 26 are in fixed engagement with the respective outer ends of the pair of stepping arms 20. The pair of mounting plates 25 extend traversely of the axis of stepping arms 19 and each mount a respective pair of vertically oriented anchor fingers 11 and a respective pair of transversely spaced, vertically oriented probe tubes 27. The mounting plates 26 are shorter than plates 25 and each serve to mount a respective pair of anchor fingers 12. The fingers 11 and 12 are sized and relatively positioned for insertion into openings 28 defined by tubes 29 in tube sheet 14. The mounting plates 26 are connected to the stepping arms 20 in such a manner that their fingers 12 are at the same elevation as fingers 11 when the piston in cylinder 23 is intermedite the upper and lower extremes of its stroke length, the stroke length of the cylinder 23 and the length of fingers 11 and 12 being such that alternatively only fingers 11, only fingers 12, or both sets of fingers 11 and 12 are inserted into the tube openings 28 at any particular time. The three relative vertical positions of base blocks 15 and 16 are illustrated in FIG. 3 wherein the lower block 16 is shown as remaining stationary for the sake of illustration and only the upper block 15 is shown as moving. In the solid line drawing of block 15, both finger sets 11 and 12 are inserted; in the dotted line drawing of block 15', only finger set 12 is inserted; and in the dotted line drawing of block 15", only finger set 11 is inserted.

Each set of anchor fingers 11 and 12 is selectively expandable in a known manner by double acting cylinders 30 and 31 respectively for gripping engagement with the wall of a respective tube 29, thereby to vertically support the platform 10. The four probe tubes 27 are located at the respective outboard ends of the pair of mounting plates 25 for alignment with respective tubes 29 (seen in FIG. 6) when the fingers 11 are inserted in other respective tubes 29. Four probe conduits 32 are connected to the probe tubes 27 respectively and extend outwardly of the steam generator 8 through manway 33 for receiving a probe or the like therewithin for transport into the respective tubes 29 with which they are aligned. Normally, only one probe tube 27 will be in use at any one time such that that one probe tube becomes the reference position of the platform 10 during its movement, as will be hereinafter discussed in greater detail.

In the illustrated embodiment of the invention, the steam generator tubes 29 are arranged such that their end openings 28 form an ordered array of openings in the tube sheet 14, as seen most clearly in FIG. 6. The tube sheet 14 is bisected by a divider plate 34, and the tube openings 28 on either side thereof are aligned in a large number of evenly spaced parallel rows "R" extending parallel to the divider 34 and a large number of evenly spaced parallel lines "L" extending perpendicularly of the divider 34 and orthogonally of the rows "R." The openings 28 in each row "R" are sequentially uniformly spaced, as are the openings in each line "L." The center-to-center spacing between adjacent pairs of openings 28 in a row "R" is 1.732 inch, whereas the center-to-center spacing between adjacent pairs of openings 28 in a line "L" is 1 inch. Further, in the illustrated tube sheet 14, the openings 28 have a so-called "triangular pitch," with the openings in any particular row "R" being offset lengthwise of the row relative to the openings in the two rows on opposite adjacent sides thereof and the openings in any line "L" being offset lengthwise of the line relative to the openings in the two lines on opposite adjacent sides thereof. The offset of the tube openings 28 is such as to form a repetitive pattern of equilateral triangles, with the openings 28 being spaced one inch between centers at the respective apices of the triangle.

Because of the parallelism of the several lines "L" and several rows "R" of tube openings 28 respectively, the openings to one side of divider 34 may have a particular address in a Cartesian coordinate system. The present coordinate system may be of the conventional type in which the "x" and "y" axes extend orthogonally of one another, with opening rows "R" extending parallel to the "x" axis and opening lines "L" extending parallel to the "y" axis, as seen in FIG. 6. Because of the offset of tube openings 28 in the illustrated "triangular pitch" array, it will be appreciated that openings 28 occur only at every other x or y address in any particular row "R" or line "L" respectively, the omitted x or y address being occupied by an opening in the next adjacent row "R" or line "L" respectively. For the sake of convenience, the Cartesian coordinate system hereinafter discussed is assumed to have its origin in the lower left corner of the upper semi-circular half of tube sheet 14, as viewed in FIG. 6, in order that the address of every opening 28 may be expressed in positive values of x and y. It should be noted that FIG. 6 is an underside view of the platform 10 and tube sheet 14 and thus the positive and negative senses of x and y appear reversed in the several elevational views of platform 10 (FIGS. 2 and 3).

The self-centering cylinders 17 and 18 are each of the double acting type, having fluid ports $35a$ and $35b$ and $36a$ and $36b$ for receiving and/or venting a pressurized fluid, such as air, selectively connected thereto. The pistons 21 and 22 in cylinders 17 and 18 respectively are biased to a precise mid-point in their normal strokes, in a manner disclosed in the aforementioned patent applications, and are actuable to respective opposite end limits for moving the respective stepping arms 19 and 20 to respective opposite extremes or limits. In the instant embodiment of the invention, the stepping arms 19 extends parallel to both the rows "R" of openings 28 and the "x" axis of the Cartesian coordinate system, and the stepping arms 20 extends parallel to both the lines "L" of openings 28 and the "y" axis. The stroke length of the stepping arms 19 is ±0.866 inch from its neutral or centered position, or ±½ the distance between centers of adjacent openings 28 in a row "R", as indicated by the broken line positionings 37' and 37" of the pair of contact plates 37 fixed to the stepping arms 19. The stroke length of the stepping arms 20 is ±0.5 inch from its neutral or centered position, or ±½ the distance between centers of adjacent openings in a line "L." The stepping arms 19 and 20 are respectively actuated by applying pressurized air from a source 38 selectively through solenoid actuated three-way control valves $+vx$, $-vx$, $+vy$ and $-vy$ to the ports $35a$, $35b$, $36a$ and $36b$ respectively in cylinders 17 and 18 respectively.

Very briefly, the platform 10 traverses the undersurface of the tube sheet 14 by releasing either the finger set 11 or the finger set 12 from gripping engagement with their respective tubes 29 while the other fingers remain in gripping engagement, withdrawing the released fingers downwardly out of the tubes, moving the withdrawn fingers transversely of both the tube sheet 14 and the finger set remaining in gripping engagement with the tube sheet into substantial alignment with respective new tubes 29, and expanding the transversely moved fingers within the respective new tubes 29. In FIG. 1, platform 10 is depicted during execution of a step in which fingers 11 are inserted in tubes 29 and fingers 12 are withdrawn for stepping.

Figure 4:
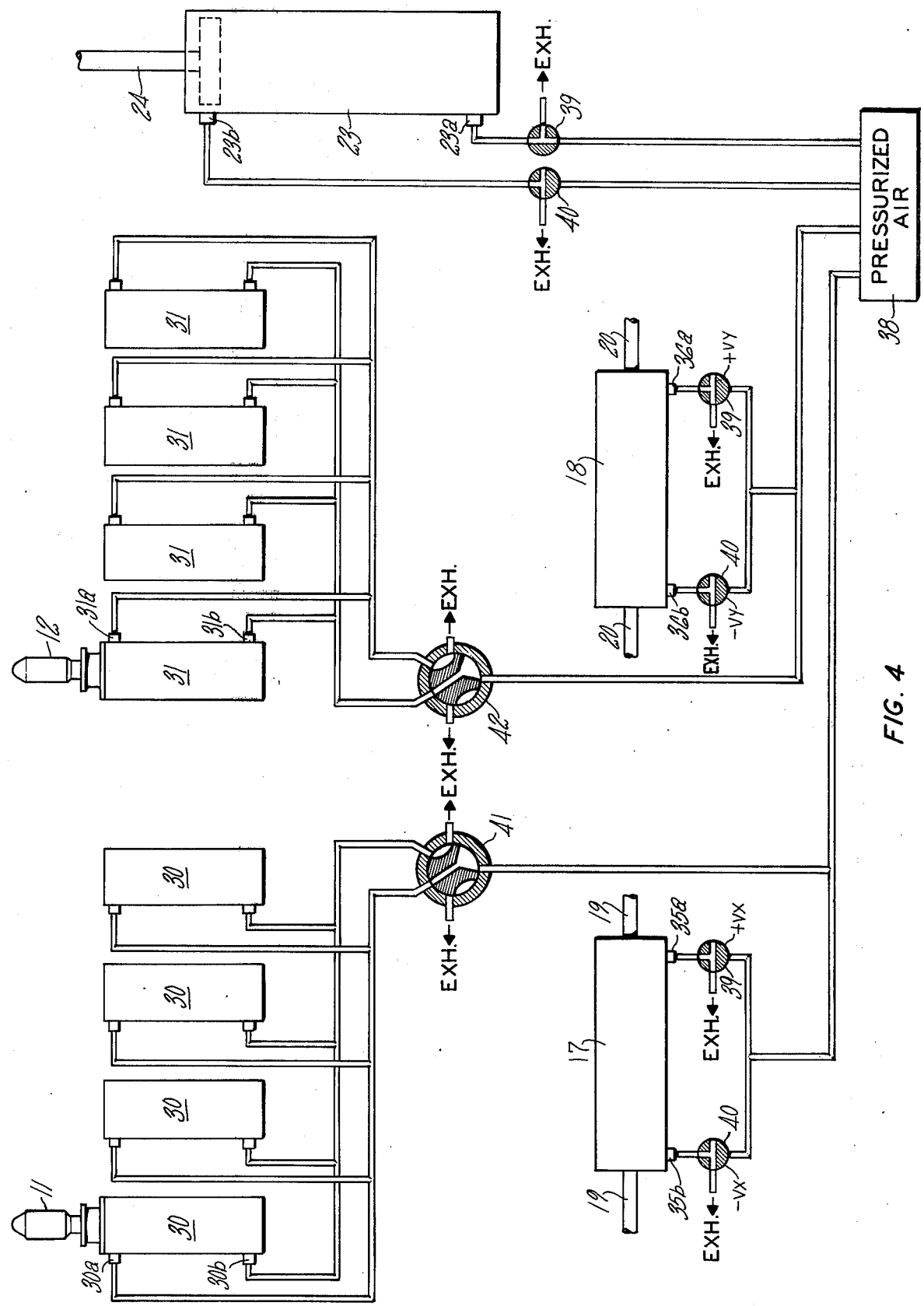
FIG. 4 is a schematic diagram of the fluid circuits employed with the particular fluid driven actuators of the illustrated surface traversing apparatus.

The several fluid circuits to the actuators which effect stepping operation of platform 10 are illustrated schematically in FIG. 4 in which the air source 38 supplies pressurized air to each of the control valves $+vx$, $-vx$, $+vy$ and $-vy$, to each of a pair of solenoid actuated three-way valves 39 and 40, and to each of two solenoid actuated four-way valves 41 and 42. The three-way valves $+vx$, $-vx$, $+vy$ and $-vy$ are each selectively operative to either admit or exhaust air respectively to or from the respective port in cylinders 17 and 18. Stepping arm 19 is moved to its limit in the "x direction by admitting air to port $35a$ in cylinder 17 and exhausting air from port $35b$, and the stepping arm is moved to its opposite limit in the $-x$ direction by reversing the flow of air through the two respective ports. Similarly, stepping arm 20 is moved to its limit in the $+y$ direction by admitting air to port $36a$ in cylinder 18 and exhausting air from port $36b$, and the stepping arm is moved to its opposite limit in the $-y$ direction by reversing the flow of air through the two respective ports. When air is permitted to exhaust from both ports $35a$ and $35b$ of cylinder 17, or both ports $36a$ and $36b$ of cylinder 18, the respective stepping arm 19 or 20 moves to its neutral position.

The three-way valves 39 and 40 are connected to ports 23a and 23b respectively in cylinder 23 and are operative to vary the separation between base blocks 15 and 16. Valves 39 and 49 are each selectively operative to either admit or exhaust the flow of air respectively to or from the respective port in cylinder 23. The base blocks 15 and 16 are urged or moved relatively apart when air is admitted to port 23a and exhausted from port 23b, and the base blocks are moved relatively toward one another by reversing the flow of air through the two respective ports. Stop surfaces associated with the respective finger sets 11 and 12 limit the extent to which the respective fingers are insertable into the tubes in tube sheet 14, and both sets of fingers are normally fully inserted when the piston in cylinder 23 is at the mid-point of its stroke. Thus, if only one set of fingers 11 and 12 is inserted in (and engages) the tube sheet 14, relative separation of blocks 15 and 16 will operate to insert fingers 11 and relative closure of blocks 15 and 16 will operate to insert fingers 12. Of course, the relationships will be reversed if it is the removal of one of the two sets of previously inserted fingers 11 and 12 that is involved. When both finger sets 11 and 12 are inserted and expanded, the valves 39 and 49 operate to exhaust air from ports 23a and 23b.

Two complementary ports of the four-way valve 41 are connected to the opposite ports 30a and 30b respectively of each of the actuating cylinders 30 for fingers 11. Similarly, two complementary ports of the four-way valve 42 are connected to the opposite ports 31a and 31b respectively of each of the actuating cylinders 31 for fingers 12. In each instance, the fingers 11 or 12 are relatively expanded by admitting air to the upper ports 30a or 31a in the respective cylinders 30 or 31, and are relatively contracted by reversing the direction of flow of the driving air. To prevent either set of fingers 11 or 12 from releasing from engagement with the tube sheet 14 in the event of electrical power failure to either valve 41 or 42, the valves are connected to apply air pressure to ports 30a and 31a when de-energized.

In accordance with the invention, the stepping operation of the platform 10 is remotely controlled, either manually, semi-automatically, or automatically, through selection of pre-established move sequences as with a programmable controller 44 located externally of the steam generator 8, as seen in FIG. 1. Electrical conductors (not shown) extend from various limit switches on the platform 10 to the controller 44 through manway 33 in the steam generator. The pressurized air supply 38 and the various solenoid actuated control valves "vx, −vx, +vy, −vy, 39, 40, 41 and 42 through which air is selectively passed to and from the various cylinders 17, 18, 23, 30 and 31 are also positioned externally of the steam generator 8, with the various fluid conduits which extend through the manway 33 and connect the control valves with the platform 10 being omitted from FIG. 1 in the interest of clarity.

Eight limit switches 45–52 are associated with the platform 10 (as seen in FIGS. 2 and 3) for sensing and electrically indicating the presence of various movable components of the platform in various relative extreme or limit positions. Normally open limit switches 45 and 46 are connected to the respective opposite ends of the stepping arm 19 and are positioned to be respectively actuated when the stepping arm is at the opposite limits of its travel respectively, the actuation of limit switches 45 and 46 respectively serving to provide electrical signals indicative of the stepping arm 19 being positioned in the +x and the −x limit positions respectively relative to stepping arm 20. Similarly, normally open limit switches 47 and 48 are fixed to a rigid reinforcing strap 53 which is connected to move with the stepping arm 20 and the switches are positioned to be respectively actuated when the stepping arm 20 is at the opposite limits of its travel respectively, the actuation of limit switches 47 and 48 respectively serving to provide electrical signals indicative of the stepping arm 20 being positioned in the +y and the −y limit positions respectively relative to stepping arm 19.

A normally open limit switch 49 is connected to the mounting plate 25 and is positioned to be actuated by the undersurface of tube sheet 14 when the fingers 11 associated with the mounting plate are fully inserted into respective openings 28 to provide an electrical signal indicative of such finger insertion. Similarly, a normally open limit switch 50 is connected to the mounting plate 26 and is positioned to be actuated by the tube sheet 14 when the fingers 12 associated with that mounting plate are fully inserted into respective openings 28 to provide an electrical signal indicative of such fingers insertion.

A normally open limit switch 51 is connected to base block 16 and is positioned to be actuated by the base block 15 when the two base blocks are substantially in contact with one another to provide an electrical signal indicative of the fact that the fingers 11 associated with base block 15 are necessarily withdrawn from and clear of the tube sheet 14. A limit switch 52 is connected to base block 16 and includes a roller 54 in following engagement with a guide rod 55 which is connected to move with the base block 15. The guide rod 55 is tapered near its lower end and the limit switch roller follower 54 is positioned such that the guide rod taper actuates the limit switch 52 when the blocks 15 and 16 are substantially at their maximum separation to provide an electrical signal indicative of the fact that the fingers 12 associated with base block 16 are necessarily withdrawn from and clear of the tube sheet 14.

Four sensors 56 are positioned respectively near the upper ends of the four respective probe tubes 27 to provide respective electrical signals when a probe extends upwardly beyond the end of the respective probe tube 27. The sensors 56 may be of a type which are actuated optically, mechanically, magnetically or in some other known manner by a probe extending therepast and the resulting signal is used as an interlock to prevent at least lateral movement of the platform 10 while a probe is inserted in a steam generator tube 29.

Figure 5:
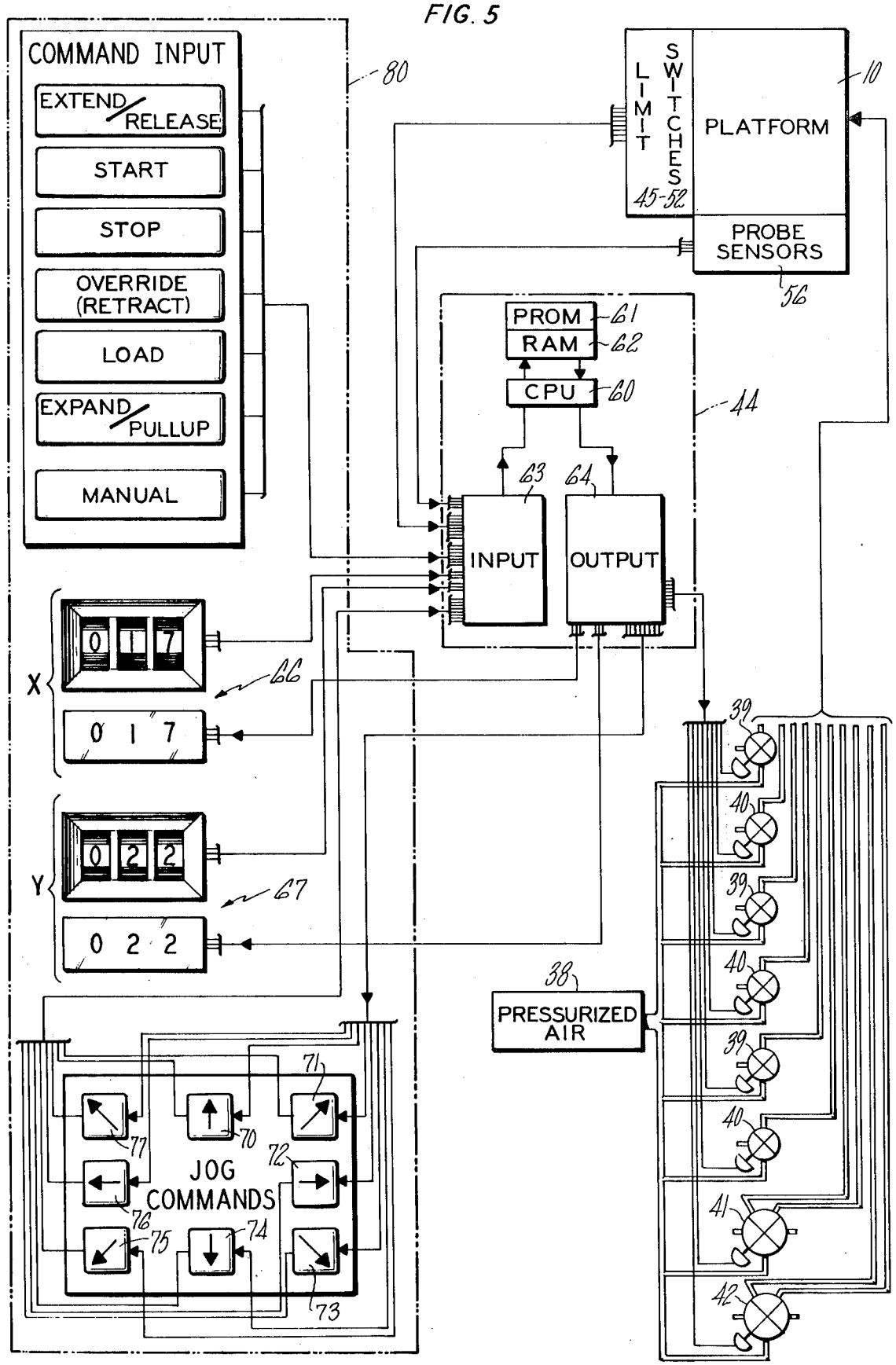
FIG. 5 is a block diagram of the control apparatus for automatically performing the method of the invention.

Considering now the apparatus which controls the operation of platform 10, reference is made to the control schematic of FIG. 1 and the more detailed block diagram of the control apparatus in FIG. 5 wherein the programmable controller 44 in the illustrated embodiment is a Pro-Log MPS 805 8 Bit Digital Microprocessor System which includes an Intel 8008 central processor unit 60, a programmable read only memory 61, a random access memory 62, and the requisite multichannel input and output circuits 63 and 64 respectively.

The following description of the manner in which platform 10 is controlled by the controller 44 is made through reference to the response actions of platform 10 which occur when various moves are to be made across tube sheet 14 and when certain conditions exist within the platform. Further disclosure of the operation of the controller 44 which is required to effect the described control of platform 10 is provided by reference to the flow charts of FIGS. 8A and B and 9A-T. The programming of the controller 44 may be readily accomplished by one skilled in the art in view of and in accordance with the disclosure contained herein and with reference to "The Designers Guide To Programmed Logic For MPS 800 Systems" by the Pro-Log Corporation of Monterey, California, it being understood that a limited degree of variation may be expected between particular programs generated by different programmers. Further, the various driving and/or encoding and/or decoding circuits which interface between the controller 44 and the respective external control components electrically connected therewith are of conventional design and, though not shown, their presence is implied.

A control console 80 mounts a plurality of command input switches referred to in FIG. 5 by their respective command functions, x and y address input switches and associated display panels 66 and 67 respectively, and an array of eight directional display lamps 70-77 of the type which include respective push button switches therewith. The manually actuable command input switches respectively designated Manual, Start, Stop, Extend/Release, Expand/Pull Up, Retract (Override), and Load are individually connected to the input circuit 63 of controller 44 for selectively applying electrical command input signals to the input circuit, the particular command input signals being selectively acknowledged by the controller 44 in accordance with the control program.

The x and y address input switches 66 and 67 respectively each comprise three rotary decade thumb wheel switches selectively settable to any three digit number, the number corresponding with the respective x or y coordinates of the address of a selected steam generator tube 29 in the array within the Certesian coordinate system illustrated in FIG. 6. The display panels associated with the respective x and y address switches 66 and 67 are connected to the output circuitry 64 of the controller 44 for digitally displaying, as determined by the control program, either the respective address coordinate settings on the respective thumb wheel switches or the address coordinates of a reference point on platform 10 (in terms of the coordinates of a particular tube 29 in alignment therewith) as the platform traverses the undersurface of tube sheet 14, as will be hereinafter described.

In the illustrated embodiment, the reference point on platform 10 is selected to be that one of the probe tubes 27 which is to be moved into alignment with a particular target tube 29 into which a probe or the like is to be inserted. This requires that the various addresses read into controller 44 be referenced to the position of that particular probe tube on the tube sheet 14, that particular probe tube being designated $27_R$ in FIGS. 6 and 7A-E. Further, it will be convenient to hereinafter refer to a target steam generator tube as $29_T$, with a further numerical subscript distinguishing one target tube from another; the steam generator tube with which probe tube $27_R$ is presently aligned is hereinafter designated $29_P$ and the steam generator tube with which probe tube $27_R$ is initially aligned when platform 10 is first installed (or before movement toward a new target tube $29_T$) is hereinafter designated $29_I$.

The eight display lamp push button switch devices 70-77 respectively are positioned and contain indicia to indicate movement of the platform 10 (or more specifically probe tube $27_R$) in a respective one of eight different directions, with display devices 70 and 74 indicating movement parallel to the lines "L" of tubes in the $+y$ and $-y$ directions respectively, display devices 72 and 76 indicating movement parallel to the rows "R" of tubes in the $+x$ and $-x$ directions respectively, and the remaining display devices 71, 73, 75 and 77 indicating movement diagonally of the lines and rows of tubes in the $+x+y$, $+x-y$, $-x-y$ and $-x+y$ directions respectively during the automatic or semi-automatic control modes.

The push button switches associated with the display devices 70-77 are individually manually actuable in a semi-automatic or so-called Jog mode to introduce a corresponding directional input command to controller 44, and alternately are individually manually actuable in a so-called Manual mode to control the energization states of respective ones or complementary pairs of all eight of the air control valves $+vx$, $-vx$, $+vy$, $-vy$, 39, 40, 41 and 42 such that separation of blocks 15 and 16, movement of stepping arms 19 and 20 across one another in the four relative directions, and expansion and contraction of fingers 11 and 12 are manually controlled to step or move platform 10.

Reference is now made to the flow charts in FIGS. 8A and B and 9A-T which reveal the nature and sequence of operation of the programmed controller 44, with further reference to the resulting movements of platform 10 as illustrated somewhat diagrammatically in FIGS. 7A-E. The flow charts of FIGS. 8A and 8E are general and the flow charts of FIGS. 9A-T provide the specific detail thereto.

All memories in controller 44 and the displays associated with address switches 66 and 67 are initialized or zeroed when power is first applied to the controller. Further, all of the directional display lamps 70-77 are extinguished and the central processor 60 will scan the command input switches, ignoring all but the Extend-/Release, Load and Manual command inputs.

Assuming the platform 10 has not yet been installed on tube sheet 14, manual actuation of the Extend-/Release switch operates to contract all fingers 11, 12 and to then pull base blocks 15 and 16 together such that fingers 12 extend beyond fingers 11 for initial insertion into respective openings 28 in tube sheet 14. The platform 10 is then introduced, either directly or remotely, to the undersurface of tube sheet 14 in the angular orientation depicted and previously discussed such that fingers 12 are inserted into appropriate openings 28. The Expand/Pull Up switch is then manually actuated and, if the limit switch 50 is actuated by contact with tube sheet 14, the fingers 12 will be expanded into gripping engagement with the respective tubes 29 into which they are inserted. (If limit switch 50 is not actuated, certain display lamps, in this instance 70 and 74, will flash until such actuation occurs.) Both stepping arms 19 and 20 are then moved to their respective neutral positions relative to their respective cylinders 17 and 18, if not previously established, by venting both ends of both cylinders 17 and 18. Attainment of the neutral positions is confirmed by the absence of actuation of any of limit switches 45-48, otherwise certain console lamps flash as indicated by the "Lost" routine of FIG. 9T. Following expansion of fingers 12 and the centering of the stepping arms 19 and 20, the fingers 11 move upwardly into respective tubes 29 and, when limit switch 49 is actuated by tube sheet 14, the fingers 11 expand into gripping engagement with the tubes 29 to complete the installation of platform 10. (If limit switch 49 is not actuated, the display lamps 70, 72, 74 and 76 will flash as instructed by the "Lost" routine.)

When the installation of platform 10 is completed, the controller 44 will accept either the Load or the Extend-/Release command inputs, the latter normally being utilized only if it is desired for some reason, such as the completion of operations, to drop the platform 10 from tube sheet 14. Assuming that it is the Load command switch which is actuated, as is normally the case, the $x$ and $y$ coordinates which will have previously been set on thumb wheel switches 66 and 67 respectively will be read into the memory of controller 44 and concurrently displayed on the display panels associated with the respective thumb wheel switches. The $x$ and $y$ coordinates set on thumb wheels 66 and 67 will be those of the particular steam generator tube $29_I$ aligned with probe tubes $27_R$, in this instance $x = 017$, $Y = 022$. A preliminary check may be made by controller 44 prior to entering the $x$ and $y$ coordinates to assure that fingers 11 and 12 are installed, inasmuch as the "Load" operation might be occuring after an earlier sequence of moves rather than directly after installation. When the initial coordinates have been read into memory, the controller 44 will accept a command input from any one of the six aforementioned command switches, and additionally from any respective one of the eight switches 70–77 as a Jog command.

The platform 10 may be moved across tube sheet 14 either automatically in a mode which commences with actuation of the Start command switch and utilizes automatically selected move sequences, or semi-automatically in single moves of one opening pitch using the aforementioned move sequences in response to actuation of selected ones of the Jog switches 70–77, or manually in response to carefully patterned actuation of switches 70–77 following actuation of the Manual command switch (which is located and actuated in a manner intended to prevent its unauthorized use.) Limited movement is also possible by actuating the Retract (Override) command switch and then a selected one of the Jog button switches 70–77, resulting in the movement of stepping arm 19 and probe tube $27_R$ one opening in the selected direction, but without inserting fingers 11 into their respective tubes 29. This latter move is used if one of the tubes 29 into which a finger 11 would otherwise have been inserted is plugged or otherwise unenterable.

The description will proceed assuming operation in the automatic mode. The coordinates of the particular steam generator tube to be inspected, for instance tube $29_{T1}$, or $29_{T2}$ in FIG. 6, are now set on the $x$ and $y$ thumb-wheel switches 66 and 67 respectively and the Start command switch is then actuated to initiate the following automatic control sequence.

A "Start Flag" is set in the controller memory, the coordinates of the target tube $29_T$ are read into the controller memory from the thumb wheel switches, and the present location of probe tube $27_R$ is displayed on the display panels associated with the thumb wheel switches 66, 67. This displayed location will correspond initially with tube $29_I$, but will change with each subsequent move of probe tube $27_R$ as the location stored in memory is updated to $29_P$ in accordance with the particular move executed as verified by the appropriate changes in the signals from limit switches 45–48. Then, assuming that neither the Stop or Manual command switches have been actuated and that the "Start Flag" remains set, the selection of the appropriate move from the multiplicity of move routines illustrated in FIG. 9H occurs as will be hereinafter explained.

The $y$ coordinate of the tube $29_I$ (or $29_P$ in subsequent moves) is algebraically compared with the $y$ coordinate of the target tube $29_T$ and the algebraic difference, if any, is temporarily placed in a register A in controller 44. Next, the algebraic quantity in the register A is algebraically compared with zero to determine whether it is greater than, less than or equal to zero and the resulting decision directs the routine either to "MY" (FIG. 9G) if less than, to "PY" (FIG. 9F) if greater than, or to a consideration of the $x$ coordinate if equal to zero. Should the $y$ coordinate be equal to zero, the $x$ coordinate of the tube $29_I$ (or $29_P$ in subsequent moves) is algebraically compared with the $x$ coordinate of the target tube $29_T$ and the algebraic difference, if any, is temporarily placed in the register A replacing the $Y$ coordinate comparison quantity. Next, the algebraic quantity now in register A is algebraically compared with zero to determine whether it is greater than, less than, or equal to zero and the resulting decision directs the routine either to MV7 if less than, to MV3 if greater than, or to "Stop" if equal to zero.

The "Stop" routine appears in FIG. 9I, which is self-descriptive, and provides for at least temporarily halting further movement of platform 10. It will be appreciated that this condition occurs when the coordinates of tube $29_P$, and thus probe tube $27_R$, are the same as the target tube $29_P$, signifying attainment of the target. Further, it will be appreciated that the sequence in which the $x$ and $y$ coordinates were evaluated could be reversed with appropriate adjustment of the designated move or decision routines to be selected.

Referring to the decision routines "PY" and "MY," the decisional flow charts of FIGS. 9F and 9G are for the most part self-explanatory, however, the following comments are provided for amplification. The $y$ coordinate difference quantity placed in register A is compared with the value one (+1 for "PY", −1 for "MY") to determine equality or inequality, and the $x$ coordinates of tube $29_I$ (or $29_P$ in subsequent moves) and target tube $29_T$ are then algebraically compared in the same manner as previously described and placed in register A. Then, if the $y$ coordinate difference was not one (+ or − correspondingly), the $x$ coordinate difference now in register A is algebraically compared with zero to establish whether it is more than, less than, or equal to zero. If zero, then a particular move is designated; if less than zero, then one move is designated if −1 and another move is designated if not −1; and if greater than zero, then one move is designated if +1 and another move is designated if not +1.

Alternately, if the $y$ coordinate difference discussed above did equal one, the $x$ coordinate difference now in register A is algebraically compared with zero. If less than zero, then one move is designated if −1 and another move is designated if not −1; and if greater than zero, then one move is designated if +1 and another move is designated if not +1.

The particular moves designated by either decision routine "PY" or "MY" where the $y$ coordinate difference is not zero or the moves MV7 or MV3 designated in FIG. 9E where the $y$ coordinate difference is zero are all individual move routines which move the platform 10, and more specifically the probe tube $27_R$ (stepping arm 19), in the direction and magnitude illustrated in FIG. 9H.

Four of the move routines MV1, MV3, MV5 and MV7 are operative to move the platform 10 (probe tube $27_R$) to the next adjacent opening 28 respectively in the $+y$, $+x$ $-y$ and $-x$ directions relative to the starting point for that move. Another four move routines MV2, MV4, MV6 and MV8 are operative to move platform 10 diagonally a distance which is twice the pitch of tube openings 28 diagonally respectively in the $+x+y$, $+x-y$, $-x-y$, and $-x+y$ directions relative to the starting point for that move. The term "diagonal" is here meant to indicate the direction from one tube opening 28 in one row "R" and line "L" of openings to another tube opening 28 in another row "R" and line "L" of openings immediately adjacent the one row and line. A further four move routines MV2A, MV4A, MV6A and MV8A are also operative to move the platform 10 diagonally respectively in the $+x+y$, $+x-y$, $-x-y$ and $-x+y$ directions, but the magnitude of the move is limited to the simple pitch between tube openings 28 in the diagonal direction.

Speaking generally, each of the twelve aforementioned move routines considers the relative positions of stepping arms 19, 20 as indicated by limit switches 45-48 and, if necessary, preliminarily steps the arm 20 relative to tube sheet 14 to a so-called "cocked" position from which the arm 19 that carries probe tube $27_T$ is then moved across the tube sheet in the direction and magnitude indicated for that move routine. Following execution of the movement of arm 19, the particular move routine returns or jumps to the "Move" location in the main portion of the routine illustrated in FIG. 9E, to complete an iterative control loop which continues to repeat that particular move routine until the algebraic difference between one of the coordinates of target tube $29_T$ and the same coordinate of probe tube $27_R$ is zero, whereupon if the platform has been traveling diagonally, as to $29_{T1}$ in FIG. 6, the platform then automatically adopts a move routine parallel to the appropriate "x" or "y" axis to null the difference in the remaining coordinate ($+y$ for tube $29_T$). When the platform 10 has moved to the same position as target tube $29_T$, the control routine or program jumps to "Stop" as previously discussed.

Upon completion of each pass through a move routine, the various limit switches 45-48 are scanned to verify that the corresponding move has been completed and to update the "present" address or location of tube $29_P$ and probe tube $27_R$ which had been stored in memory in the controller 44 at the start of that cycle of the move routine. The completion of each cycle of a move routine results in a predetermined combination of switches 45-48 which are actuated, and the switches 45-48 are monitored to verify that they have undergone the correct changes in actuation for that move sequence. Assuming the move is verified by the limit switches, one or the other or both of the x and y coordinates of the present address of probe tube $27_R$ are incremented, positively and/or negatively and by a count of one or two, as appropriate, to establish a new present address in memory for comparison with the coordinate of target tube $29_T$ on the next pass through the control loop.

More specifically, each stepping move of each stepping arm 19 or 20 is accompanied by an updating of the location stored in memory, with attendant retention of the "former" location of the respective stepping arm until the entire move routine has been completed whereupon the only location stored in memory and displayed is that of probe tube $27_R$ in its "new" location.

At this point, it will be helpful to consider in greater detail a representative one of each of the three major different move routines, the details of each of the remaining nine move routines being then obvious to one skilled in the art without need to resort to further explanation herein.

Considering first the move routine MV1 which is illustrated in FIG. 9J and which results in the platform 10 being moved in the $+y$ direction in the same line "L" of openings 28, the limit switches 45-48 are scanned to determine if any are actuated, and if yes, then a check is made to determine if limit switch 47 is actuated. Limit switch 47 actuation indicates that the arm 20 is extended in the $+y$ direction relative to its base block 16, similar to the illustration of FIG. 7C, thereby "cocking" the arm 20 for subsequently stepping the arm 19 and probe tube $27_R$ a full step in the $+y$ direction to complete the move.

With the arm 20 so "cocked," the control program is ordered to set one of several bit sequence patterns, each of which is operative to actuate one or both of stepping arms 19, 20 to a respective one of their three respective positions relative to their respective base blocks 15, 16 such that each bit sequence pattern results in a different relative positioning of arms 19 and 20. These bit sequence patterns control actuation of one or both pairs of control valves, $+vx$, $-vx$ and $+vy$, $-vy$. In this instance, the bits are set to move arm 20 to the $-y$ limit.

Figure 9M:
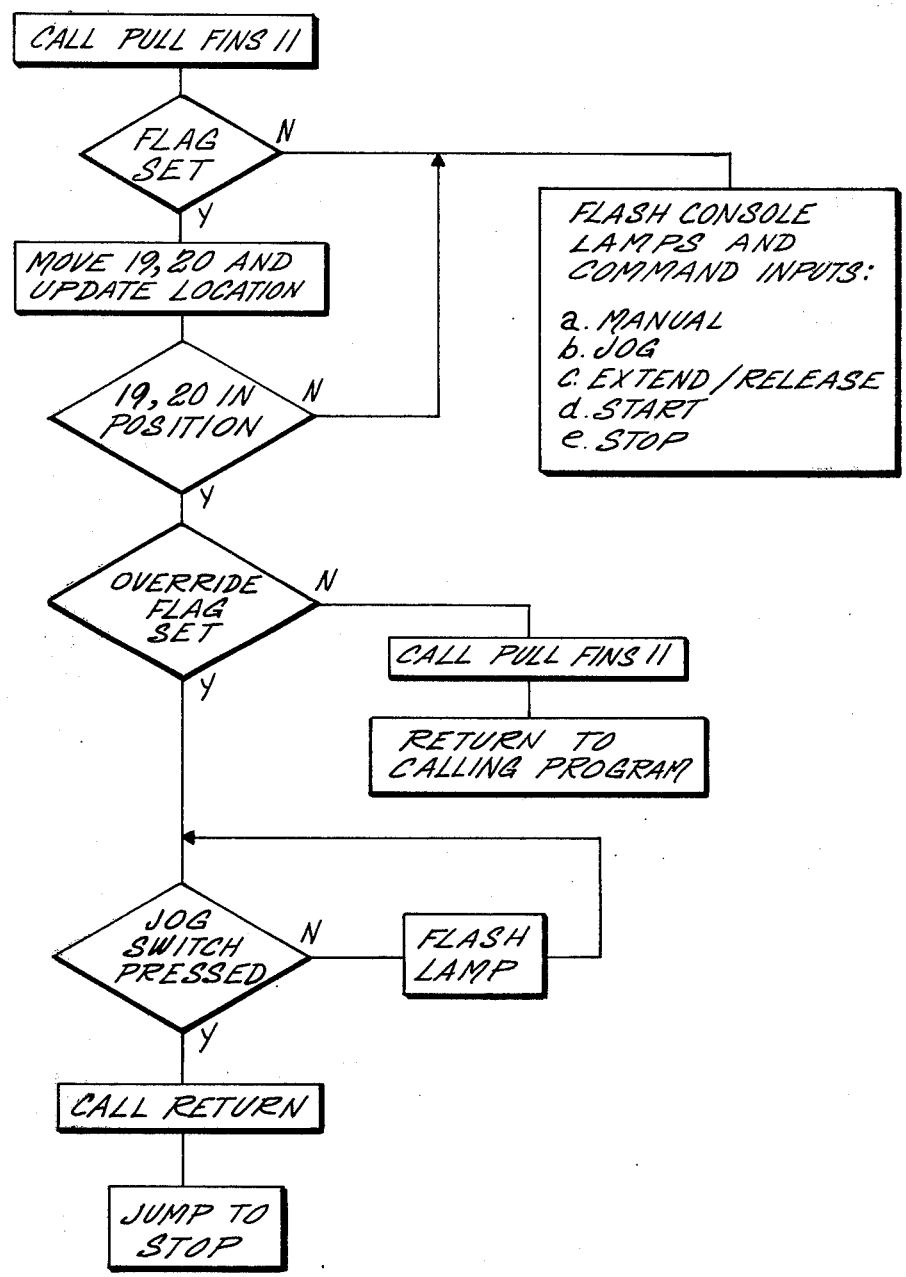
FIGS. 9A-T depict flow charts which provide the specific detail to the generalized flow charts of FIGS. 8A-B in accordance with the illustrated embodiment of the invention.

The next step in the MV1 routine calls "19, 20 x", which is illustrated in FIG. 9M. This step is responsible generally for withdrawing the fingers 11 from tube sheet 14, moving the appropriate stepping arm 19 and/or 20 (in this instance 20) as determined by the bit sequence pattern which was set, and reinserting the fingers 11 in the "new" openings 28 to which they have been moved. In move MV1 even though it is arm 20 which is actuated from its $+y$ to its $-y$ limit, the fact that fingers 12 remain inserted and fingers 11 are withdrawn results in the blocks 15, 16 and arm 19 moving in the $+y$ direction by the full stroke length of arm 20, thereby advancing probe tube $27_R$ to the next adjacent opening 28 in the same line "L" of openings from which it started. Repetition of this move routine results in the platform 10 attaining target tube $29_{T2}$ of FIG. 6, as illustrated in FIG. 7D.

If in the MV1 move routine the limit switch 47 had not been actuated but other limit switches had, a bit sequence pattern would be set to move arm 20 to its $+y$ limit and the routine would then call "19, 20 y" which is similar to "19, 20 x" but which instead withdraws fingers 12 such that they move with stepping arm 20 across tube sheet 14 to new openings 28 into which they are inserted. By moving the arm 20 and fingers 12 to the $+y$ limit, the arm 19 and probe tube $27_R$ are then "cocked" for their $+y$ step.

Further, if in the MV1 routine, none of the limit switches 45-48 had been actuated, this would signify that arms 19, 20 were centered. From this centered position, arm 20 is only capable of being stepping in the $+y$ direction one half of is total stroke length in the direction which fails to place fingers 12 in alignment with any openings 28. Therefore, the bit sequence pattern is set to move arm 19 to its $-x$ limit from center and arm 20 to its $+y$ limit from center, resulting in a move of one space or pitch diagonally in the $+x+y$ direction by fingers 12 when call "19, 20 y" is executed. This then "cocks" the arm 20 as shown in FIG. 7D for subsequently moving probe tube $27_R$ and arm 19 in the +y direction.

The move routine MV2, illustrated in FIG. 9K, begins by scanning limit switches 45–48 and then determining if switches 46 and 47 are actuated, such actuation corresponding with a $-x+y$ positioning of arms 19, 20 respectively, exactly as illustrated in FIG. 7C. Assuming such a positioning exists, the bit sequence pattern is then set to move arms 19, 20 to the opposite or $+x-y$ limits and a call "19, 20 x" is then executed such that the fingers 11 are withdrawn and moved with arm 19 in the $+x+y$ diagonal direction by a distance which equals twice the diagonal pitch of the openings 28. This advances probe tube $27_R$ by two openings 28 diagonally, as illustrated in FIG. 7E, and completes MV2.

If in routine MV2 the limit switches 46, 47 are not actuated, it is necessary to move arms 19, 20 such that the requisite switch actuation occurs. Accordingly, the bit sequence pattern is set to move arms 19, 20 to their $-x+y$ limits and a call "19, 20 y" is executed to preposition the fingers 12 such that both stepping arms 19 and 20 are "cocked" to subsequently move fingers 11.

The move routine MV2A is intended to move fingers 11 diagonally, but only in single diagonal tube pitch increments. The limit switches 45–48 are scanned to determine whether any switches are actuated, and if so, are switches 46 and 47 actuated. If none of the limit switches are actuated, the arms 19, 20 are presumed centered and the bit sequence pattern is set to move arms 19, 20 to the $+x-y$ limits and a call "19, 20 x" is executed to move the fingers 11 in the $+x+y$ direction such that probe tube $27_R$ advances diagonally by one tube pitch, as illustrated in FIG. 7B.

In the MV2A move routine, if the limit switches 46, 47 are actuated signifying a $-x+y$ positioning of arms 19, 20 respectively, the bit sequence pattern is set to move arms 19, 20 to their respective centered positions (by exhausting air from both ends of both cylinders 17, 18) and the call "19, 20 x" is executed. Because fingers 12 remain fixed and the arms 19, 20 move to centered positions, the fingers 11 and associated probe tube $27_R$ move diagonally in the $+x+y$ direction by an increment equal to the diagonal pitch between an adjacent pair of openings 28.

Further in routine MV2A, if some of limit switches 45–48 are actuated but at least one of switches 46, 47 is not, the bit pattern sequence is set to move arms 19, 20 to the $-x+y$ limit and a call "19, 20 y" is executed to step the fingers 12 and thereby actuate both limit switches 46, 47. With switches 46, 47 both actuated, the sequence described in the immediately preceding paragraph is then applicable.

This completes the major consideration of each of the three representative move routines, however, it will be useful to consider the "19, 20 x," the "19, 20 y," the "Pull Fins 11 (or 12)" and the "Push Fins 11 (or 12)" routines in greater detail.

The "19, 20 x" routine, illustrated in FIG. 9M, begins by calling a "Pull Fin 11" sequence or routine, illustrated in FIG. 9P. The "Pull Fins 11" routine begins by setting a count of two within a register in controller 44, then fingers 11 are contracted by the appropriate control of valve 41, and finally the base blocks 15, 16 are pulled together by the appropriate control of valves 39, 40 to withdraw fingers 11 from respective openings 28 in tube sheet 14. A check of limit switch 51 is repetitively made until verification is made that blocks 15, 16 are in fact together. If switch 51 is actuated, as is normally the case, the program returns to the "19, 20 x" routine with its "Flag Set." However, if the switch 51 is not actuated after being repetitively interrogated over a period of several seconds, the count of two in the register is decremented by one, valves 39, 40 are directed to move blocks 15, 16 apart and then, by return to the routine, an attempt is made once again to move the blocks 15, 16 together. If unsuccessful the second time, the register is further decremented to zero at which point the program returns to the "19, 20 x" routine with the "Flag Reset" whereupon the console display lamps flash and the controller 44 is then only able to receive the command inputs illustrated in FIG. 9M.

Assuming a "Flag Set" return to the "19, 20 x" routine, the stepping arms 19 and/or 20 are actuated in accordance with the particular previously set bit sequence pattern discussed earlier and the position of arms 19 and 20 relative to one another as sensed by switches 45–48 is used to update the position previously stored in a storage location in controller 44. Such positional updating when associated with the "19, 20 x" routine is operative to update the coordinates of the location of platform 10 on tube sheet 14 stored in memory, as earlier mentioned. Then, assuming that the "Override Flag" is not set, as is normal in the automatic mode, the "19, 20 x" routine proceeds to call "Push Fins 11" which generally corresponds to the opposite of "Pull Fins 11."

In "Push Fins 11", the routine begins by setting a count of two within a register in controller 44, then blocks 15, 16 are moved relatively apart by appropriate control of valves 39, 40 to insert fingers 11 in respective openings 28 and the fingers 11 are expanded into gripping engagement with the respective tubes 29 by the appropriate control of valve 41 and control returns to the particular move routine which called "19, 20 x." If, however, after repetitively interrogating limit switch 49 for several seconds the fingers 11 apparently were not inserted, valves 39, 40 are actuated to move the blocks 15, 16 together and the count in the register is decremented to one and, by return to the routine, a second attempt is made at inserting fingers 11 into tube sheet 14. If again unsuccessful, possibly because the tube 29 thereat is plugged or the position is occupied by a stay, the count in the register is decremented to zero and the routine jumps to the "Lastloc" routine illustrated in FIG. 9R.

The "Lastloc" routine calls the "Return" routine illustrated in FIG. 9S and also flashes the appropriate display lamps and conditions controller 44 to receive any of the input commands listed in FIG. 9R.

The "Return" routine is provided for returning a stepping arm 19 and/or 20 to its last location on tube sheet 14, or in other words, to the position it occupied at the commencement of that particular move routine cycle, when the respective fingers 11 or 12 either fail to be inserted or are not intended to be inserted in respective openings 28. A check is made to see if a "Return Flag" is set and if so, the control goes to the "Lost" routine of FIG. 9T. However, if the "Return Flag" has not previously been set it then is set and the arms 19, 20 are moved to the position which they occupied at the beginning of the particular step which was not completed. As earlier noted, this positional information has been retained in memory and is operative to control the setting of the bit sequence pattern required to return the stepping arms 19, 20 to that position. There is of course no need to "pull" a particular set of fingers 11 or 12 inasmuch as they are already withdrawn. When arms 19, 20 return to their former position, this condition is sensed and a "Push Fins 11" or "Push Fins 12" routine is performed as required to reinsert the withdrawn finger set. The "Return Flag" is then reset and the routine returns to the calling program. Should the attempt to return to the former position of arms 19, 20 be unsuccessful, the control goes instead to the "Lost" routine.

The foregoing discussion which led to the "Return" routine had digressed from the "Push Fins 11" operation in "19, 20 x". Whether the fingers 11 had either been successfully inserted at a new position or had returned to the former position and been inserted into tube sheet 14, the "19, 20 x" routine then returns control to the calling program which was one of the move routines.

The "19, 20 y" routine is essentially the same as the "19, 20 x" routine as it has been described to this point with the two exceptions that it is the fingers 12 which are withdrawn and reinserted in the tube sheet 14 and that when the positional information of arms 19, 20 is updated in storage within controller 44, the location of the platform 10 on tube sheet 14 is not changed either in storage or as displayed on the indicators associated with thumb wheel switches 66, 67.

As noted in FIGS. 9P and Q, the "Pull Fins 12" and "Push Fins 12" routines are essentially the same as "Pull Fins 11" and "Push Fins 11" with the exception that fingers 12 are involved and the operations to close and open blocks 15, 16 are reversed in sequence.

Returning to the "19, 20 x" sequence, if an "Override Flag" has been entered in the routine by actuation of the Retract command switch, the fingers 11 are not reinserted. Instead a check is made to determine whether the particular one of the switches respectively associated with the eight directional lamps 79–77 which had been actuated to introduce a respective Jog command has again been actuated. If such actuation has occurred, the "Return" routine previously discussed is called and following its completion the program stops. Had the particular Jog switch not been actuated again, certain lamps on the console would have been flashed while the routine awaited actuation of a Jog switch.

The above alternate sequence in the "19, 20 x" routine allows the probe tube $27_R$ on stepping arm 19 to be moved into alignment with a target tube $29_T$ even though one or more of the fingers 11 may not be inserted into respective openings 28 at that location. The manual control actions required once the platform 10 has moved to within "reaching" distance of the target tube $29_T$ are the actuation of the Retract command switch and then the actuation of the particular Jog switch 70–77 which results in stepping the arm 19 in the desired direction.

At this juncture, it should be explained that a normal jog operation, unlike the sequence discussed in the immediately foregoing paragraph, is intended to complete its move by inserting the withdrawn fingers into new openings 28 in tube sheet 14. The normal jog operation simply requires that the controller 44 be conditioned to receive a Jog command and that the appropriate one of Jog switches 70–77 then be actuated to effect a single move of platform 10, and specifically probe tube $27_R$, a distance corresponding with the simple pitch between tube openings 28 in the direction of the move. The move routines MV1, MV2A, MV3, MV4A, MV5, MV6A, MV7 and MV8A may be entered and executed directly by actuation of the respective Jog switches 70–77, thereby effecting the desired jog move. Because of this directness of control between the Jog switches and the specific move routines, no additional pictorial representation of this control sequence is considered necessary.

Referring briefly to the "fully" manual control of movement of platform 10 from one location to another on tube sheet 14, the switches associated with display lamps 70–77 are operative, as earlier noted, in a Manual mode to control the energization states of respective ones or complementary pairs of all eight of the air control valves which control movement of the platform. To enter the "Manual" routine mode, illustrated in FIG. 90, the Manual input command switch must be actuated to an "on" state and, following a delay of several milliseconds, the console lamps associated with those control valve solenoids which are energized at the moment are lighted. Each successive actuation of a particular switch 70–77 while in the Manual mode results in the respective control valve solenoid changing its energization state, with lamps being lighted to signify energization of a respective solenoid. The operator, by knowing the control response effected by the particular energization states of the control valve solenoids, may then effect the component actuation steps of a particular move by manually actuating carefully selected ones of the switches 70–77 to change the energization states of the respective solenoids in the sequence previously described for the particular move.

The "Manual" routine also provides for monitoring the limit switches, including switches 45–48, such that when a particular move sequence has been completed, as signified by the sequence of changes of limit switch actuation, the location of platform 10 is updated in storage within controller 44 and is displayed.

When the Manual command switch is actuated to the "off" state, the "Manual" routine scans switches 49, 50 to determine whether both sets of fingers 11, 12 are inserted in tube sheet 14 and if so, the program stops; and if not, the program directs the appropriate console lamps to flash and enables the controller 44 to respond to a Manual input command or to an Extend/Release input command. Actuation of the Manual or the Stop command input switches during execution of a move routine will not interrupt operation until completion of that move cycle, as evident in FIG. 9E.

The four probe sensors 56 are connected to the input circuitry 63 of controller 44 to provide signal inputs thereto whenever a probe extends beyond the respective probe tube (normally $27_R$) into a steam generator tube $29_T$. Though not specifically illustrated in the accompanying flow charts of FIGS. 8A and B and 9A–T, a signal from any of the probe sensors 56 indicating that a probe is inserted in a steam generator tube is operative as an interlock to prevent any movement of the platform 10 such that neither the platform nor the probe is inadvertently dislodged or damaged.

It will be appreciated that while the illustrated embodiment of the method and apparatus of the invention take the form of a control system for a particular platform 10 on a tube sheet 14 in which the openings 28 are in an array having a so-called "triangular" patterning, the control system is readily adaptable to a surface traversing apparatus or platform which operates on a tube sheet in which the openings assume a so-called rectangular or square pitch patterning. Where such a rectangular pitch tube pattern exists, each stepping arm of the surface traversing apparatus may be simplified for actuation to each of only two extreme positions relative to the supporting base blocks. The extreme positions may be spaced by the pitch between adjacent openings in lines and rows of tube openings respectively such that the apparatus moves by using only full strokes or steps of the stepping arms without need to resort to the intermediate or centered positioning and half strokes of the stepping arms in the embodiment illustrated. Accordingly, the generalized flow charts of FIGS. 8A and 8B are applicable to both situations and the flow charts of FIGS. 9A-T are similarly applicable with but a few relatively obvious simplifications.

If the simplified two-position stepping arm type of platform is used for a rectangular pitch patterning of openings in a tube sheet, the chart of FIG. 9C would be modified by moving each of the stepping arms to a respective one of its two extreme positions, rather than centered positions, to establish a start reference positioning; the decisional process for determining which move routine to employ is simplified because none of the short diagonal moves which bore the postscript A in the illustrated routines would be utilized, though the normal diagonal moves would now cover a diagonal pitch of one space only; and the provision in each of the move routines MV1, MV3, MV5 and MV7 for moving the stepping arms off of possibly centered positions would be unnecessary and would be deleted.

As will be apparent to persons skilled in the art, various modifications, adaptations and variations of the foregoing specific disclosure can be made without departing from the teachings of the present invention.

The embodiments of the invention in which an exclusive property or privilege is claimed are defined as follows:

1. In a surface traversing apparatus adapted to move across the surface of a member, the member having an ordered array of openings in the surface thereof, the openings being aligned and uniformly spaced in plural evenly spaced parallel lines and plural evenly spaced parallel rows respectively parallel to the $x$ and $y$ axes of a Cartesian coordinate system, each opening having a separate address in the Cartesian coordinate system, the surface traversing apparatus including first and second interconnected stepping arms, the first and second stepping arms extending transversely of one another at the angle defined by the intersection of the $x$ and $y$ axes of the Cartesian coordinate system and each being selectively longitudinally reciprocable to at least two respective positions, the distance between the at least two positions of the first and second stepping arms respectively corresponding with an integer multiple of the spacing along the respective axes between adjacent lines and adjacent rows of member openings respectively, selectively operative drive means connected to the first and second stepping arms to step the first and second stepping arms transversely of one another each to a respective selected one of the at least two positions, first and second anchor means connected to the first and second stepping arms respectively, each of the first and second anchor means being selectively insertable into and alternately retractable from member openings for respectively engaging and disengaging the respective first and second stepping arms with the member, selectively operative drive means connected to the first and second anchor means for selectively engaging and disengaging either of the first and second stepping arms with the member, the method of moving a reference point carried by the surface traversing apparatus from a present address thereof expressed in $x$ and $y$ coordinates relative to the member openings toward a target address expressed in $x$ and $y$ coordinates relative to the member openings comprising the steps of:

providing an indication of the algebraic difference between the target address and the present address, the difference indication being expressed algebraically in terms of an $x$ coordinate difference component and a $y$ coordinate difference component;

providing a multiplicity of executory move control routines, each one of the move control routines being operative to control operation of the stepping arm drive means and operation of the anchor means drive means for moving the surface traversing apparatus an increment in a respective one of a multiplicity of different directions within the Cartesian coordinate system, a first direction being parallel to one of the axes of the Cartesian coordinate system, a second direction being parallel to the other axis of the Cartesian coordinate system and a third direction extending diagonally of the axes of the Cartesian coordinate system angularly between the first and second particular directions, each move increment advancing the apparatus reference point relatively from a present member opening to at least the next adjacent member opening in the direction of movement by sequentially at least disengaging one of the first and second stepping arms with respect to the member, stepping at least one of the first and second stepping arms to a respective one of its at least two positions and normally re-engaging the disengaged one of the stepping arms with respect to the member;

selecting one of those move control routines which move the surface traversing apparatus in the first, second and third directions respectively, the selected routine being one which moves the surface traversing apparatus in a direction having a component in the Cartesian coordinate system in the direction of a non-zero component in the difference indication; and executing the selected one of the multiplicity of move control routines.

2. The method of claim 1 including the additional step of sequentially repeating the steps of claim 1 until both the $x$ and $y$ coordinates of the present address and target address are the same.

3. The method of claim 2 wherein the step of selecting the move control routine comprises the steps of selecting the move control routine which incrementally moves the surface traversing apparatus in the third particular direction diagonally of the axes at least when both components of the address difference indication are numerically equal to or greater than one and their combined signs are indicative of the third particular direction relative to the surface traversing apparatus, and alternatively selecting the move control routine which incrementally moves the surface traversing apparatus in the first or the second particular direction respectively parallel to the one or the other of the axes at least when one of the components in the address difference indication is zero and the only non-zero component is measured along the one or the other of the axes respectively and its sign is indicative of the respective first or second direction relative to the surface traversing apparatus.

4. The method of claim 3 wherein the member openings in each line and row of member openings are offset in the direction of the longitudinal extent of the respective line or row relative to the respective pair of lines or pair of rows of openings on the immediately adjacent opposite sides thereof whereby a triangularly pitched patterning of the openings in the array is provided, each of the first and second stepping arms is respectively longitudinally reciprocable to two opposite extreme positions and a center position midway between its respective opposite extreme positions, the distance between the respective opposite extreme positions of the first and second stepping arms being equal to twice the spacing along the respective axes between adjacent lines and adjacent rows of member openings respectively, the stepping arm drive means is selectively operative to step either of the first and second stepping arms to any one of its respective opposite extreme and center positions, and wherein the move control routines include first and second different move control routines for moving the surface traversing apparatus in the third direction diagonally of the coordinate system axes, the first one of the third direction move control routines being operative to advance the apparatus reference point relatively from a present member opening to the second member opening therefrom in the direction of movement and the second one of the third direction move control routines being operative to advance the apparatus reference point relatively from a present member opening to the next adjacent member opening in the direction of movement, and including the steps of selecting the second one of the third direction move control routines when both components of the address difference indication are a numerical one and selecting the first one of the third direction move control routines when both components of the address difference indication are greater than a numerical one.

5. The method of claim 2 wherein the step of providing an indication of the difference between the target address and the present address comprises the steps of generating electrical representations of the respective $x$ and $y$ coordinate components of the target address, generating electrical representations of the respective $x$ and $y$ coordinate components of the present address; and algebraically comparing the respective $x$ and $y$ coordinate components of the present address with the respective $x$ and $y$ coordinate components of the target address and generating respective electrical representations indicative of the algebraic difference therebetween.

6. The method of claim 5 wherein the step of generating the electrical representations of the $x$ and $y$ coordinate components of the present address of the surface traversing apparatus reference point includes the steps of initially generating an electrical representation of the $x$ and $y$ coordinate components of an initial present address of the surface traversing apparatus; storing the electrical representation of the present address; and changing the stored electrical representation of the present address in accordance with the change of position of the apparatus reference point with each execution of a move control routine thereby to update the present address electrical representations.

7. The method of claim 6 wherein the step of changing the stored electrical representation of the present address includes the steps of sensing both the particular relative positioning of the first and second stepping arms occurring for a respective particular move control routine and the relative movement of the first and second stepping arms to the sensed relative positioning for generating an algebraically signed electrical count incrementing representation commensurate with the magnitude and direction of the move, and algebraically adding the electrical count incrementing representation to the electrical representation of the present address stored prior to the particular move, the algebraic sum of the addition being the prior address updated following the particular move.

8. The method of claim 2 wherein when both the $x$ and $y$ components of the address difference indication are numerically equal to or greater than one, the repetitive step of selecting the move control routines comprises selecting cumulatively the move control routines which move the surface traversing apparatus in at least the third direction and additionally in either the first or the second direction which result in movement of the surface traversing apparatus to the target address in the minimum number of move increments.

9. The method of claim 1 wherein the number of move control routines is at least eight for respectively moving the surface traversing apparatus an increment in a particular one of at least eight different directions, a first four of the directions being parallel to the lines and rows of member openings and including said first and said second particular directions, a second four of the directions extending diagonally of the lines and rows of member openings and including said third direction, each direction of the second four of the directions being angularly intermediate a respective different pair of angularly adjacent directions of the first four of the directions.

10. The method of claim 1 including the sequential steps of sensing insertion of a particular one of the first or second anchor means into a member opening for engagement with the member and generating a signal representative thereof, checking for the presence of the signal representative of anchor means insertion during a move control routine within a predetermined time after operation of the anchor means drive means to insert the particular first or second anchor means being moved, operating the stepping arm drive means to return the stepping arm which supports the particular first or second anchor means to its original location for that particular move increment if the signal representative of anchor means insertion is not present, and operating the anchor means drive means to insert the particular first or second anchor means into the member opening thereat.

11. The method of claim 1 wherein each of said move routines comprises the later steps of sequentially disengaging a particular one of the first and second stepping arms with respect to the member, stepping at least one of the first and second stepping arms to a respective one of its respective at least two positions such that the disengaged particular stepping arm and the surface traversing apparatus reference point are advanced a move increment in the appropriate direction, and normally re-engaging the particular disengaged one of the stepping arms with respect to the member; and the earlier steps of sequentially sensing the relative positions of the first and second stepping arms, determining logically whether or not the relative positioning of the first and second stepping arms is one which permits the disengaged particular stepping arm in said later steps to be advanced a move increment in the appropriate direction for the routine, and executing a move subroutine to reposition the one of the stepping arms other than said particular stepping arm to a position relative to said particular stepping arm from which said particular stepping arm may execute said later steps if the relative positioning of the first and second stepping arms is determined as not permitting said particular stepping arm to be advanced the move increment.

12. The method of claim 1 wherein the member being traversed is a tube sheet in a steam generator, the openings being defined by steam generator tubes in the tube sheet, the reference point carried by the surface traversing apparatus comprises a probe tube fixed to one of the first and second stepping arms for alignment with a steam generator tube and for conducting inspection means therethrough into the steam generator tube aligned therewith, and comprising the additional steps of sensing the presence of inspection means beyond a certain place in the probe tube as being indicative of insertion of the inspection means into the steam generator tube and generating a signal indicative of such insertion, and preventing operation of at least the first and second stepping arm drive means when the inspection means insertion signal is present.

13. For use in traversing the surface of a member, the member having an ordered array of openings therein aligned and uniformly spaced in plural evenly spaced parallel lines and plural evenly spaced parallel rows respectively parallel to the $x$ and $y$ axes of a Cartesian coordinate system, each opening having a separate address in the Cartesian coordinate system, in combination, a surface traversing apparatus including first and second interconnected stepping arms, the first and second stepping arms extending transversely of one another at the angle defined by the intersection of the $x$ and $y$ axes of the Cartesian coordinate system and each being selectively longitudinally reciprocable to at least two positions, the distance between the respective at least two positions of the first and second stepping arms corresponding respectively with an integer multiple of the spacing along the respective axis between adjacent lines and adjacent rows of member openings respectively, signal controlled drive means connected to the first and second stepping arms to selectively step either or both of the first and second stepping arms transversely of the other each to a respective selected one of the respective at least two positions, first and second anchor means connected to the first and second stepping arms respectively, each of the first and second anchor means being selectively insertable into and alternately retractable from member openings for respectively engaging and disengaging the respective first and second stepping arms with the member, signal controlled drive means connected to the first and second anchor means for selectively engaging and alternately disengaging either of the first and second stepping arms with the member; and control apparatus for controlling the movement of the surface traversing apparatus comprising means for sensing the positions of the first and second stepping arms relative to one another and generating signals indicative thereof, means providing a multiplicity of alternately selectable executory move control routines, each move control routine being responsive to the signals indicative of the relative positioning of the first and second stepping arms for generating a respective particular sequence of control signals for controlling operation of the stepping arm drive means and the anchor means drive means such that the surface traversing apparatus is moved an increment in a respective one of a multiplicity of different directions within the Cartesian coordinate system, each move increment advancing the surface traversing apparatus reference point relatively from a present member opening to at least the next adjacent member opening in the direction of movement by sequentially at least disengaging a particular one of the first and second stepping arms with respect to the member, driving at least one of the first and second stepping arms to a respective one of its at least two positions to move the disengaged particular stepping arm and normally re-engaging the disengaged particular one of the stepping arms with respect to the member, a first one of the move directions being parallel to one of the axes of the Cartesian coordinate system, a second one of the move directions being parallel to the other axis of the Cartesian system and a third one of the move directions extending diagonally of the axes of the Cartesian coordinate system, and means for selectably connecting the stepping arms drive means and the anchor means drive means with the sequenced control signals of a selected one of the executory move control routines.

14. The apparatus of claim 13 wherein the means for selectably connecting the stepping arm drive means and the anchor means drive means with a selected move control routine include means for providing signals representative of the $x$ and $y$ coordinates respectively of the present address of a reference point on the surface traversing apparatus as referenced to the member openings, means for providing signals representative of the $x$ and $y$ coordinates respectively of a target address for the reference point on the surface traversing apparatus as referenced to the member openings, means for algebraically comparing the $x$ and $y$ coordinate signals of the present address with the respective $x$ and $y$ coordinate signals of the target address and generating respective $x$ and $y$ component difference signals representative of the respective algebraic difference therebetween, and means responsive to the respective $x$ and $y$ component difference signals for connecting the stepping arm drive means and the anchor means drive means with the control signals of a selected one of those move control routines which move the surface traversing apparatus in the first, second or third directions respectively, the routine selected for connection being one which moves the surface traversing apparatus in a direction having a component in the Cartesian coordinate system in the direction of a non-zero component in the $x$ and $y$ component difference signals.

15. The apparatus of claim 14 wherein said means for providing the signals representative of the $x$ and $y$ coordinates of the present address include means for repetitively updating the present address following each incremental move of the surface traversing apparatus whereby the surface traversing apparatus moves automatically in increments toward the target address until the target address and the present address are the same.

16. The apparatus of claim 15 wherein the means responsive to the respective $x$ and $y$ component difference signals for selecting and connecting a particular drive control routine to the stepping arm drive means and the anchor means drive means is operative to select the move control routine which incrementally moves the surface traversing apparatus in the third particular direction diagonally of the axes at least when both components of the address difference signal are numerically equal to or greater than one and their combined signs are indicative of the third particular direction relative to the surface traversing apparatus, and alternatively to select the move control routine which incrementally moves the surface traversing apparatus in the first or the second particular direction respectively parallel to the one or the other of the axes at least when one of the components in the address difference signal is zero and the only non-zero component is measured along the one or the other of the axes respectively and its sign is indicative of the respective first or second direction relative to the surface traversing apparatus.

17. The apparatus of claim 14 wherein the signals indicative of the positions of the first and second stepping arms relative to one another are electrical signals and wherein said means for providing the signals representative of the $x$ and $y$ coordinate of the present address comprise means for generating electrical signals repesentative of the $x$ and $y$ coordinates respectively of an initial present address; means for storing the electrical signals representative of the $x$ and $y$ components of the initial present address; means responsive to the electrical signals representative of the relative positions of the first and second stepping arms for generating algebraically signed electrical signals representative of the incremental changes in the $x$ and the $y$ coordinates respectively of the present address of the surface traversing apparatus following a corresponding incremental move of said particular one of the first and second stepping arms relative to the other; and means for algebraically adding the electrical signals representative of the incremental changes in the $x$ and $y$ coordinates respectively to the respective $x$ and $y$ electrical signal representations stored in the signal storing means thereby to update the present address stored therein following each successive incremental move of the surface traversing apparatus.

18. The apparatus of claim 14 wherein the member openings in each line and row of member openings are offset in the direction of the longitudinal extent of the respective line or row relative to the respective pair of lines or pair of rows of openings on the immediately adjacent opposite sides thereof whereby a triangularly pitched patterning of the openings in the array is provided, each of the first and second stepping arms is respectively longitudinally reciprocable to two opposite extreme positions and a center position midway between its respective opposite extreme positions, the distance between the respective opposite extreme positions of the first and second stepping arms being equal to twice the spacing along the respective axes between adjacent lines and adjacent rows of member openings respectively, the stepping arm drive means is selectively operative to step either of the first and second stepping arms to any one of its respective opposite extreme and center positions, the move control routines providing means provide first and second different move control routines for moving the surface traversing apparatus in the third direction diagonally of the coordinate system axes, the first one of the third direction move control routines being operative to advance the apparatus reference point relatively from a present member opening to the second member opening therefrom in the direction of movement and the second one of the third direction move control routines being operative to advance the apparatus reference point relatively from a present member opening to the next adjacent member opening in the direction of movement and means responsive to the respective $x$ and $y$ component difference signals for connecting the stepping arm drive means and the anchor means to the control signals of the second one of the third direction move control routines when both components of the difference signals are numerically one and to the control signals of the first one of the third direction move control routines when both components of the difference signals are numerically greater than one.

19. The apparatus of claim 18 wherein each of the first and second stepping arms is longitudinally reciprocable to only the respective two opposite extreme positions and the center position, and the stepping arm drive means is similarly operative to step either of the first and second stepping arms only to any one of its respective opposite extreme or center positions.

20. The apparatus of claim 13 wherein the move control routine providing means provide move control routines for respectively moving the surface traversing apparatus an increment in a respective one of at least eight different directions, a first four of the directions being parallel to the lines and rows of member openings and including said first and said second directions, and a second four of the directions extending diagonally of the lines and rows of member openings and including said third direction, each direction of the second four of the directions being angularly intermediate a respective different pair of angularly adjacent directions of the first four of the directions.

21. The apparatus of claim 13 wherein the control apparatus includes means for sensing insertion of each of the first and second anchor means respectively into respective member openings for engagement with the member and generating respective signals representative of such insertion, means operative with each move control routine and responsive to the absence of a respective anchor means insertion signal after a predetermined time following operation of the anchor means drive means to insert the particular first or second anchor means being moved for generating a control signal operatively connected to the stepping arm drive means to return the stepping arm which supports the particular first or second anchor means to its beginning location for that particular move increment, and means operative when the stepping arm drive means is operated to return the stepping arm supporting the particular first or second anchor means to said beginning location and responsive to the signals indicative of the relative positionings of the first and second stepping arms for generating a control signal operatively connected to the anchor means drive means to insert the respective first or second anchor means into a respective member opening at said beginning location when returned thereto.

22. The apparatus of claim 13 wherein the means providing the multiplicity of move control routines includes logic means responsive to the signals indicative of the relative positions of the first and second stepping arms in each respective move control routine for determining whether or not the relative positioning of the first and second stepping arms is satisfactory for said particular one of the first and second stepping arms to be disengaged from the member and advanced by said move increment in the appropriate direction for the respective move routine and generating signals indicative of satisfactory or unsatisfactory relative positionings respectively, means responsive to the signal indicative of an unsatisfactory relative positioning of the first and second stepping arms for generating a respective particular sequence of control signals for controlling operation of the stepping arm drive means and the anchor means drive means to reposition that stepping arm other than said particular stepping arm to a position relative to said particular stepping arm from which said particular stepping arm may be disengaged from the member and advanced said move increment, said other stepping arm being repositioned by disengaging its respective anchor means from the member, driving at least one of the first and second stepping arms to a respective one of its at least two positions, and normally re-engaging the disengaged anchor means of said other stepping arm, and means responsive to the signal indicative of a satisfactory relative positioning of the first and second stepping arms to generate said control signals which are operative to disengage said particular one of the first and second stepping arms, drive at least one of the first and second stepping arms, and normally re-engage said disengaged particular stepping arm thereby to advance the surface traversing apparatus reference point by a move increment in the appropriate direction.

23. The apparatus of claim 22 wherein the means providing the multiplicity of move control routines comprises a properly programmed programmable digital controller.

24. The apparatus of claim 13 wherein the member is a tube sheet in a steam generator, the member openings being defined by steam generator tubes in the tube sheet, said surface traversing apparatus includes a guide tube fixed thereto for movement therewith into alignment with a respective steam generator tube following each move increment, said guide tube being adapted to conduct an inspection means therethrough into the steam generator tube aligned therewith; and said control apparatus includes means connected to the surface traversing apparatus for sensing the presence of inspection means at or extending beyond a certain location in the tube and generating a signal indicative thereof, said inspection means location signal being indicative of inspection means extending beyond the location in the guide tube in the direction of the steam generator tube, and interlock means responsive to said inspection means location signal for inhibiting operation of at least said first and second stepping arm drive means when extension of inspection means beyond said location in the guide tube is indicated.

25. The apparatus of claim 24 wherein said tube is connected to move with said particular one of the first and second stepping arms and comprises said reference point carried by said surface traversing apparatus.

* * * * *

UNITED STATES PATENT OFFICE
CERTIFICATE OF CORRECTION

Patent No. 4,074,814                Dated February 21, 1978

Inventor(s) David E. Cooper, Leon C. Hendee, Walter G. Hill, Jr., Adam Leshem and Martin L. Marugg It is certified that error appears in the above-identified patent and that said Letters Patent are hereby corrected as shown below:

Column 4, line 46, change "traversely" to --transversely--.

Column 6, line 57, change " " " to --+--.

Column 7, line 6, change "49" to --40--.

Column 7, line 26, change "49 to --40--.

Column 7, line 53, change " " " to --+--.

Column 14, line 63, change "is" to --its--.

Column 17, line 38, change "79" to --70--.

Signed and Sealed this

Twenty-first Day of October 1980

[SEAL]

Attest:

Attesting Officer

SIDNEY A. DIAMOND

Commissioner of Patents and Trademarks